United States Patent
Hyde et al.

(10) Patent No.: US 9,767,934 B2
(45) Date of Patent: Sep. 19, 2017

(54) METHOD, SYSTEM, AND APPARATUS FOR THE THERMOELECTRIC CONVERSION OF GAS COOLED NUCLEAR REACTOR GENERATED HEAT

(75) Inventors: Roderick A. Hyde, Redmond, WA (US); Muriel Y. Ishikawa, Livermore, CA (US); Nathan P. Myhrvold, Medina, WA (US); Joshua C. Walter, Kirkland, WA (US); Thomas Allan Weaver, San Mateo, CA (US); Lowell L. Wood, Jr., Bellevue, WA (US); Victoria Y. H. Wood, Livermore, CA (US)

(73) Assignee: TerraPower, LLC, Bellevue, WA (US)

( * ) Notice: Subject to any disclaimer, the term of this patent is extended or adjusted under 35 U.S.C. 154(b) by 2519 days.

(21) Appl. No.: 12/462,054

(22) Filed: Jul. 28, 2009

(65) Prior Publication Data

US 2010/0260305 A1 Oct. 14, 2010

Related U.S. Application Data

(63) Continuation-in-part of application No. 12/386,052, filed on Apr. 13, 2009, and a continuation-in-part of application No. 12/460,979, filed on Jul. 27, 2009.

(51) Int. Cl.
*G21C 9/00* (2006.01)
*G21D 7/04* (2006.01)
*G21D 3/00* (2006.01)
*G21D 3/04* (2006.01)
*G21D 3/08* (2006.01)

(52) U.S. Cl.
CPC ............ *G21D 7/04* (2013.01); *G21D 3/00* (2013.01); *G21D 3/04* (2013.01); *G21D 3/08* (2013.01)

(58) Field of Classification Search
CPC .......... G21H 1/10; G21H 1/103; G21H 1/106; G21D 7/00; G21D 7/04
USPC ................. 376/207, 215, 241, 317, 320–322
See application file for complete search history.

(56) References Cited

U.S. PATENT DOCUMENTS

| | | | |
|---|---|---|---|
| 2,748,710 | A | 6/1956 | Vandenberg |
| 2,902,423 | A | 9/1959 | Luebke et al. |
| 3,093,569 | A | 6/1963 | Post |
| 3,276,914 | A | 10/1966 | Shoupp |
| 3,277,321 | A | 10/1966 | Klein et al. |
| 3,430,079 | A | 2/1969 | Danko et al. |
| 3,537,910 | A | 11/1970 | Zogran et al. |
| 3,547,778 | A | 12/1970 | Flaherty et al. |

(Continued)

FOREIGN PATENT DOCUMENTS

| CN | 1086038 A | 4/1994 |
|---|---|---|
| CN | 1890821 A | 1/2007 |

(Continued)

OTHER PUBLICATIONS

McGraw-Hill, Encyclopedia of Science & Technology, 9th Edition, "Nuclear Reactor"; pp. 177-185; published 2002.*

(Continued)

*Primary Examiner* — Marshall O'Connor

(57) ABSTRACT

A method, system, and apparatus for the thermoelectric conversion of nuclear reactor generated heat including thermoelectrically converting gas cooled nuclear reactor generated heat to electrical energy and supplying the electrical energy to an operation system of the nuclear reactor system.

67 Claims, 29 Drawing Sheets

(56) References Cited

U.S. PATENT DOCUMENTS

| | | | |
|---|---|---|---|
| 3,598,652 | A | 8/1971 | Magladry |
| 3,601,887 | A * | 8/1971 | Mitchell .................. H01L 35/34 |
| | | | 136/201 |
| 3,793,144 | A | 2/1974 | Magladry |
| 3,801,284 | A | 4/1974 | Meckler |
| 4,042,757 | A | 8/1977 | Jones |
| 4,459,528 | A | 7/1984 | Nola |
| 4,508,677 | A | 4/1985 | Craig et al. |
| 4,689,194 | A | 8/1987 | Wachholz et al. |
| 4,699,754 | A * | 10/1987 | French .................. G21C 15/18 |
| | | | 376/281 |
| 4,784,824 | A | 11/1988 | Gandrille et al. |
| 4,818,475 | A | 4/1989 | Gluntz et al. |
| 4,851,183 | A | 7/1989 | Hampel |
| 5,039,457 | A | 8/1991 | Terada et al. |
| 5,124,115 | A | 6/1992 | Dillmann |
| 5,202,083 | A | 4/1993 | Spinks et al. |
| 5,255,296 | A | 10/1993 | Schultz |
| 5,268,942 | A | 12/1993 | Newton et al. |
| 5,621,776 | A | 4/1997 | Gaubatz |
| 5,623,109 | A | 4/1997 | Uchida et al. |
| 5,650,904 | A | 7/1997 | Gilley et al. |
| 5,817,958 | A | 10/1998 | Uchida et al. |
| 7,493,974 | B1 * | 2/2009 | Boncodin .............. B60K 16/00 |
| | | | 180/2.2 |
| 2003/0072403 | A1 | 4/2003 | Dagard |
| 2005/0012204 | A1 * | 1/2005 | Strnad .................... F25B 21/02 |
| | | | 257/712 |
| 2006/0018420 | A1 | 1/2006 | Tessien |
| 2006/0117782 | A1 | 6/2006 | Rini et al. |
| 2006/0251204 | A1 | 11/2006 | Tsang et al. |
| 2007/0137684 | A1 | 6/2007 | Gruen |
| 2007/0253520 | A1 | 11/2007 | Sim et al. |
| 2007/0280400 | A1 | 12/2007 | Keller |
| 2008/0300660 | A1 * | 12/2008 | John .................... A61N 1/3785 |
| | | | 607/61 |
| 2010/0260306 | A1 | 10/2010 | Hyde et al. |
| 2010/0260307 | A1 | 10/2010 | Hyde et al. |

FOREIGN PATENT DOCUMENTS

| | | |
|---|---|---|
| CN | 1940254 A | 4/2007 |
| GB | 894207 | 4/1962 |

OTHER PUBLICATIONS

"Thermoelectric" | Define Thermoelectric at Dictionary.com, p. 3, retrieved from dictionary.com Nov. 7, 2016.*

PCT International Search Report; International App. No. PCT/US10/01075; Nov. 23, 2010; pp. 1-2.

PCT International Search Report; International App. No. PCT/US10/01073; Nov. 23, 2010; pp. 1-2.

PCT International Search Report; International App. No. PCT/US10/01074; Nov. 22, 2010; pp. 1-2.

McGraw-Hill Encyclopedia of Science & Technology, 9th Edition, "Nuclear Reactor"; pp. 177-185; published 2002.

PCT International Search Report; International App. No. PCT/US10/01076; Oct. 14, 2010; pp. 1-3.

Chinese State Intellectual property Office First Office Action; App. No. 201080026277.1; Mar. 4, 2014 (received by our agent Mar. 11, 2014); 11 pages (no translation).

Definition from Oxford Dictionary Online; "Mechanical"; Oxford English Dictionary; printed on Apr. 2, 2014; total of 16 pages; located at: http://www.oed.com/view/Entry/115544?redirectedFrom=mechanical&print.

Chinese State Intellectual Property Office, Decision of Non-Final Rejection; App. No. 201080026282.2 (Based on PCT Patent Application No. PCT/US2010/001074; Mar. 4, 2014 (received by our Agent on Mar. 7, 2014); 14 pages.

* cited by examiner

METHOD, SYSTEM, AND APPARATUS FOR THE THERMOELECTRIC CONVERSION OF GAS COOLED NUCLEAR REACTOR GENERATED HEAT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States Patent Application entitled METHOD AND SYSTEM FOR THE THERMOELECTRIC CONVERSION OF NUCLEAR REACTOR GENERATED HEAT, naming RODERICK A. HYDE; MURIEL Y. ISHIKAWA; NATHAN P. MYHRVOLD; JOSHUA C. WALTER; THOMAS WEAVER; VICTORIA Y. H. WOOD AND LOWELL L. WOOD, JR. as inventors, filed Apr. 13, 2009, application Ser. No. 12/386,052, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD, SYSTEM, AND APPARATUS FOR THE THERMOELECTRIC CONVERSION OF GAS COOLED NUCLEAR REACTOR GENERATED HEAT, naming RODERICK A. HYDE; MURIEL Y. ISHIKAWA; NATHAN P. MYHRVOLD; JOSHUA C. WALTER; THOMAS WEAVER; LOWELL L. WOOD, JR. AND VICTORIA Y. H. WOOD as inventors, filed Jul. 27, 2009, application Ser. No. 12/460,979, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Thermoelectric devices and materials can be utilized to convert heat energy to electric power. Thermoelectric devices are further known to be implemented within a nuclear fission reactor system, so as to convert nuclear fission reactor generated heat to electric power during reactor operation.

SUMMARY

In one aspect, a method includes but is not limited to thermoelectrically converting gas cooled nuclear reactor generated heat to electrical energy and supplying the electrical energy to at least one operation system of the gas cooled nuclear reactor system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein—referenced method aspects depending upon the design choices of the system designer.

In one aspect, a system includes but is not limited to means for thermoelectrically converting gas cooled nuclear reactor generated heat to electrical energy and means for supplying the electrical energy to at least one operation system of the gas cooled nuclear reactor system. In addition to the foregoing, other system aspects are described in the claims, drawings, and text forming a part of the present disclosure.

In one aspect, an apparatus includes but is not limited to at least one thermoelectric device for thermoelectrically converting gas cooled nuclear reactor generated heat to electrical energy and at least one electrical output of the at least one thermoelectric device electrically coupled to at least one operation system of the gas cooled nuclear reactor system for supplying the electrical energy to the at least one operation system of the gas cooled nuclear reactor system. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1:
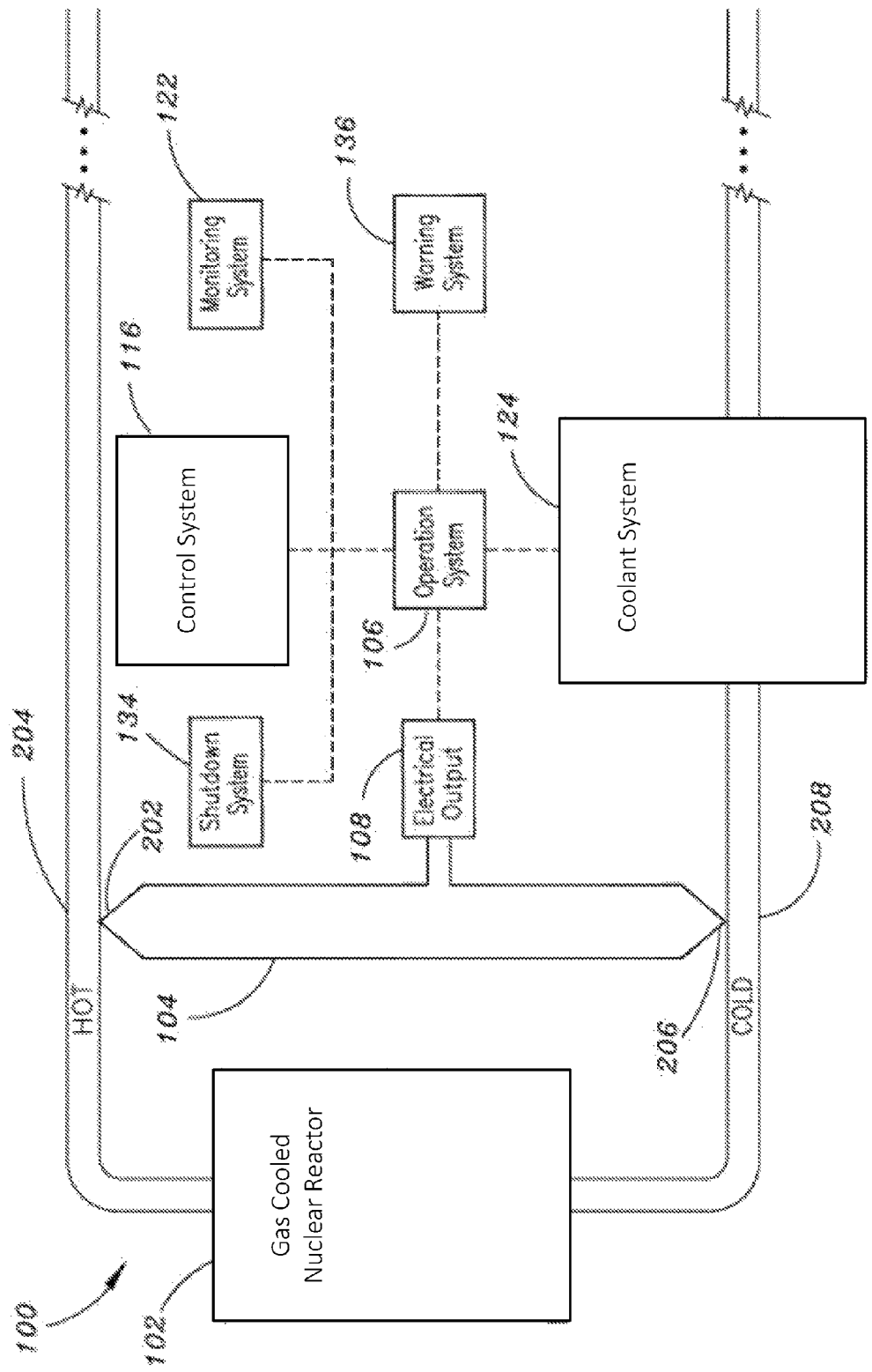
FIG. 1 is a schematic illustrating a system for the thermoelectric conversion of gas cooled nuclear reactor generated heat to electrical energy and the supplying of the electrical energy to an operation system of the gas cooled nuclear reactor system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1 through 6, a system 100 for the thermoelectric conversion of gas cooled nuclear reactor generated heat is described in accordance with the present disclosure. One or more thermoelectric devices 104 (e.g., a junction of two materials with different Seebeck coefficients) may convert heat (e.g., operational heat, decay heat, or residual heat) produced by the gas (e.g. pressurized helium or pressurized carbon dioxide) cooled nuclear reactor 102 of the nuclear reactor system 100 to electrical energy. Then, the electrical output 108 of the thermoelectric device 104 may supply electrical energy to an operation system 106 of the gas cooled nuclear reactor system 100.

In embodiments illustrated in FIG. 1, the gas cooled nuclear reactor 102 of the gas cooled nuclear reactor system 100 may include, but is not limited to, a gas cooled thermal spectrum nuclear reactor, a gas cooled fast spectrum nuclear reactor, a gas cooled multi-spectrum nuclear reactor, a gas cooled breeder nuclear reactor, or a gas cooled traveling wave reactor. For example, the heat produced from a gas cooled thermal spectrum nuclear reactor may be thermoelectrically converted to electrical energy via one or more than one thermoelectric device 104. Then, the electrical output 108 of the thermoelectric device 104 may be used to supply electrical energy to an operation system 106 of the gas cooled nuclear reactor system 100. By way of further example, the heat produced from a gas cooled traveling wave nuclear reactor may be thermoelectrically converted to electrical energy via one or more than one thermoelectric device 104. Then, the electrical output 108 of the thermoelectric device 104 may be used to supply electrical energy to an operation system 106 of the nuclear reactor system 100.

In an additional embodiment, illustrated in FIG. 1, the electrical output 108 of a thermoelectric device 104 may supply electrical energy to a control system 116 of the gas cooled nuclear reactor system 100. For example, the electrical output 108 of a thermoelectric device 104 may supply electrical energy to a rod control system of the gas cooled nuclear reactor system 100. By way of further example, the electrical output 108 of a thermoelectric device 104 may supply electrical energy to a valve control system of the gas cooled nuclear reactor system 100.

In another embodiment, the electrical output 108 of a thermoelectric device 104 may supply electrical energy to a monitoring system 122 of the gas cooled nuclear reactor system 100. For example, the monitoring system of the gas cooled nuclear reactor system 100 may include, but is not limited to, one or more than one thermal monitoring system, pressure monitoring system, or radiation monitoring system.

In another embodiment, the electrical output 108 of the thermoelectric device 104 may supply electrical energy to a coolant system 124 (e.g., primary coolant system or secondary coolant system) of the gas cooled nuclear reactor system 100. For example, the electrical output 108 of a thermoelectric device 104 may supply electrical energy to a coolant pump of a coolant system 124 of the gas cooled nuclear reactor system 100. By way of further example, the electrical output 108 of a thermoelectric device 104 may supply electrical energy to a coolant pump coupled to the primary coolant loop of the coolant system 124 of the gas cooled nuclear reactor system 100. Further, the electrical output 108 of the thermoelectric device 104 may supply electrical energy to a coolant pump coupled to the secondary coolant loop of the coolant system 124 of the gas cooled nuclear reactor system 100. Additionally, the electrical output 108 of the thermoelectric device 104 may supply electrical energy to a coolant pump of the gas cooled nuclear reactor system 100, wherein the coolant pump circulates or aides in circulating at least one pressurized gas coolant of a coolant system of the gas cooled nuclear reactor system 100. For example, the pressurized gas coolant may include, but is not limited to, helium, super critical carbon dioxide, or nitrogen.

In another embodiment, the electrical output 108 of a thermoelectric device 104 may supply electrical energy to a shutdown system 134 of the gas cooled nuclear reactor system 100. For example, the electrical output 108 of a thermoelectric device 104 may supply electrical energy to a shutdown system 134 employed during scheduled shutdown of the gas cooled nuclear reactor system 100. By way of further example, the electrical output 108 of a thermoelectric device 104 may supply electrical energy to a shutdown system 134 employed during an emergency shutdown (e.g., SCRAM) of the gas cooled nuclear reactor system 100. Further, the electrical output 108 of a thermoelectric device 104 may supply electrical energy to a shutdown system 134 while the shutdown system 134 is in a stand-by mode of operation.

In another embodiment, the electrical output 108 of a thermoelectric device 104 may supply electrical energy to a warning system 136 of the gas cooled nuclear reactor system 100. For example, the warning system 136, may include, but is not limited to, a visual warning system (e.g., a computer monitor signal, an LED, an incandescent light) or an audio warning system (e.g., auditory signal transmitted via alarm or digital signal sent to CPU and interpreted as audio signal). By way of further example, the warning system 136 may transmit a warning signal to an observer (e.g., on-site operator/user or off-site authorities). Even further, the warning system may transmit the warning signal wirelessly (e.g., radio wave or sound wave) or by wireline, such as a data transmission line (e.g., copper line or fiber optic cable).

In another embodiment, the electrical output 108 of a thermoelectric device 104 may be used to partially drive an operation system 106 of the gas cooled nuclear reactor system 100. For example, the electrical power supplied to an operation system by the electrical output 108 of a thermoelectric device 104 may drive or partially drive the operation system 106 of the gas cooled nuclear reactor system 100. For example, the electrical output 108 of the thermoelectric device 100 may drive or partially drive one or more of the following operation systems 106 of the gas cooled nuclear reactor system 100: the control system 116, the monitoring system 122, the coolant system 124 (e.g., primary coolant system or secondary coolant system), the shutdown system 134, or the warning system 136. By way of further example, the electrical energy supplied to a coolant pump of a coolant system 124 of the gas cooled nuclear reactor system 100 may drive or partially drive the coolant pump. For instance, the electrical energy supplied to a coolant pump coupled to the primary coolant loop of the gas cooled nuclear reactor system 100 may drive or partially drive the coolant pump coupled to the primary coolant loop. In another instance, the electrical energy supplied to a coolant pump coupled to the secondary coolant loop of the gas cooled nuclear reactor system 100 may drive or partially drive the coolant pump coupled to the secondary coolant loop.

In an embodiment, gas cooled nuclear reactor generated heat may be converted to electrical energy via a thermoelectric device 104 placed in thermal communication (e.g., placed in thermal communication ex-situ or in-situ) with a portion of the gas cooled nuclear reactor system 100. For example, the thermoelectric device 104 may be placed in thermal communication with a portion of the gas cooled nuclear reactor system 100 during the construction of the gas cooled nuclear reactor system 100. By way of further example, the gas cooled nuclear reactor system 100 may be retrofitted such that a thermoelectric device 104 may be placed in thermal communication with a portion of the gas cooled nuclear reactor system 100. Further, the thermoelectric device 104 may be placed in thermal communication with a portion of the gas cooled nuclear reactor system 100 during operation of the gas cooled nuclear reactor system 100 via a means of actuation (e.g., thermal expansion, electromechanical actuation, piezoelectric actuation, mechanical actuation). Then, a thermoelectric device 104 in thermal communication with a portion of the gas cooled nuclear reactor system 100 may convert gas cooled nuclear reactor generated heat to electrical energy.

Figure 2:
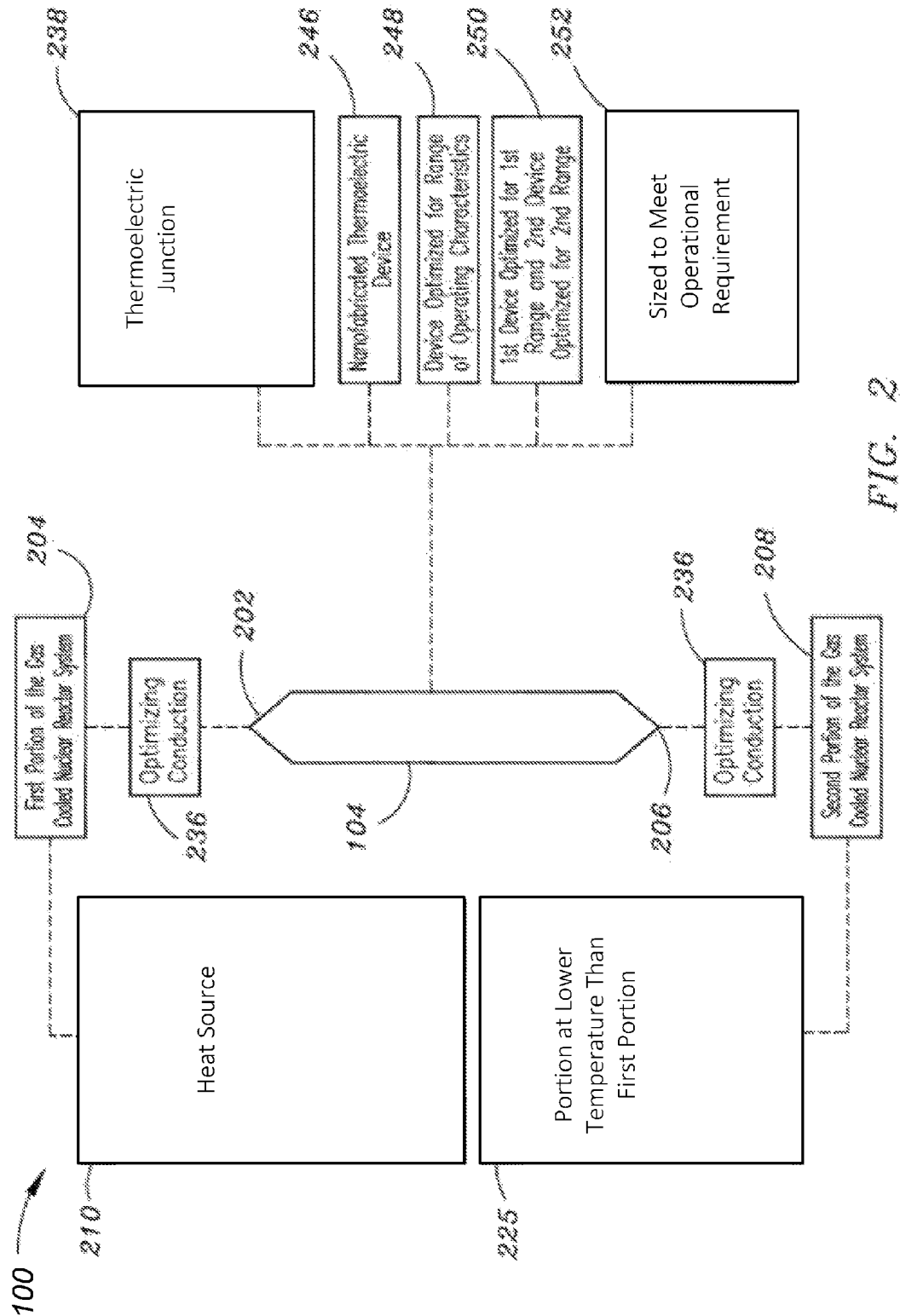
FIG. 2 is a schematic illustrating the types of devices used for the thermoelectric conversion of the gas cooled nuclear reactor generated heat and different portions of the gas cooled nuclear reactor suitable for thermal communication with the thermoelectric conversion devices.

In another embodiment, illustrated in FIG. 2, gas cooled nuclear reactor generated heat may be converted to electrical energy via a thermoelectric device 104 having a first portion 202 in thermal communication with a first portion 204 of the gas cooled nuclear reactor system 100 and a second portion 206 in thermal communication with a second portion 208 of the nuclear reactor system 100. For example, the first portion 202 of the thermoelectric device 104 may be in thermal communication with a heat source 210 of the gas cooled nuclear reactor system. By way of further example, the heat source 210 may include, but is not limited to, a nuclear reactor core, a pressure vessel, a containment vessel, a coolant loop, a coolant pipe, a heat exchanger, or a coolant (e.g., coolant of the primary coolant loop of the gas cooled nuclear reactor system 100).

In a further embodiment, the second portion 208 of the gas cooled nuclear reactor system may be at a lower temperature 225 than the first portion 204 of the gas cooled nuclear reactor system 100. For example, the first portion 204 of the gas cooled nuclear reactor system 100 may comprise a portion of the primary coolant system (e.g., at a temperature above 300° C.) of the gas cooled nuclear reactor system 100 and the second portion 208 of the nuclear reactor system 100 may comprise a portion of a condensing loop (e.g., at a temperature below 75° C.) of the gas cooled nuclear reactor system 100. By way of further example, the second portion 208 of the gas cooled nuclear reactor system 100 may include, but is not limited to, a coolant loop, a coolant pipe, a heat exchanger, a coolant (e.g., coolant of the secondary coolant loop of the gas cooled nuclear reactor 100), or an environmental reservoir (e.g., a lake, a river, or a subterranean structure). For instance, a first portion 202 of a thermoelectric device 104 may be in thermal communication with a heat exchanger of the gas cooled nuclear reactor system 100 and the second portion 206 of the thermoelectric device 104 may be in thermal communication with an environmental reservoir (e.g., a lake, a river, a subterranean structure, or the atmosphere). In another instance, a first portion 202 of a thermoelectric device 104 may be in thermal communication with the coolant of the primary coolant loop of the gas cooled nuclear reactor system 100 and the second portion 206 of the thermoelectric device 104 may be in thermal communication with the coolant of the secondary coolant loop of the gas cooled nuclear reactor system 100.

In another embodiment, the thermoelectric device 104 and a portion of the gas cooled nuclear reactor system 100 may both be in thermal communication with a means for optimizing thermal conduction 236 (e.g., thermal paste, thermal glue, thermal cement, or other highly thermally conductive materials) between the thermoelectric device 104 and the portion of the gas cooled nuclear reactor system 100. For example, the first portion 202 of the thermoelectric device 104 may be contacted to the first portion 204 of the gas cooled nuclear reactor system 100 using thermal cement. Further, the second portion 206 of the thermoelectric device 104 may be contacted to the first portion 208 of the gas cooled nuclear reactor system 100 using thermal cement.

In an embodiment, the thermoelectric device 104 used to convert gas cooled nuclear reactor generated 102 heat to electrical energy may comprise at least one thermoelectric junction 238 (e.g., a thermocouple or other device formed from a junction of more than one material each with different Seebeck coefficients). For example, the thermoelectric junction 238 may include, but is not limited to, a semiconductor-semiconductor junction (e.g., p-type/p-type junction or n-type/n-type junction) or a metal-metal junction (e.g., copper-constantan). By further example, the semiconductor-semiconductor junction may include a p-type/n-type semiconductor junction (e.g., p-doped bismuth telluride/n-doped bismuth telluride junction, p-doped lead telluride/n-doped lead telluride junction, or p-doped silicon germanium/n-doped silicon germanium junction).

In another embodiment, the thermoelectric device 104 used to convert gas cooled nuclear reactor 102 generated heat to electrical energy may comprise at least one nanofabricated thermoelectric device 246 (i.e., a device wherein the thermoelectric effect is enhanced due to nanoscale manipulation of its constituent materials). For example, the nanofabricated device 246 may include, but is not limited to, a device constructed in part from a quantum dot material (e.g., PbSeTe), a nanowire material (e.g., Si), or a superlattice material (e.g., $Bi_2Te_3/Sb_2Te_3$).

In another embodiment, the thermoelectric device 104 used to convert gas cooled nuclear reactor 102 generated heat to electrical energy may comprise a thermoelectric device optimized for a specified range of operating characteristics 248. For example, the thermoelectric device optimized for a specified range of operating characteristics 248 may include, but is not limited to, a thermoelectric device having an output efficiency optimized for a specified range of temperature. For instance, the thermoelectric device 104 may include a thermoelectric device with a maximum efficiency between approximately 200° and 500° C., such as a thermoelectric device comprised of thallium doped lead telluride. It will be appreciated in light of the description provided herein that a gas cooled nuclear reactor system 100 incorporating a thermoelectric device 104 may incorporate a thermoelectric device having maximum output efficiency within the operating temperature range of the gas cooled nuclear reactor system 100.

In another embodiment, the heat generated by the gas cooled nuclear reactor 102 may be converted to electrical energy using a first thermoelectric device optimized for a first range of operating characteristics and a second thermoelectric device optimized for a second range of operating characteristics 250. For example, the output efficiency of a first thermoelectric device may be optimized for a first range in temperature and the output efficiency of a second thermoelectric device may be optimized for a second range in temperature. For instance, the gas cooled nuclear reactor generated heat may be converted to electrical energy using a first thermoelectric device having a maximum efficiency between approximately 500° and 600° C. and a second thermoelectric device having a maximum efficiency between approximately 400° and 500° C. In a further embodiment, the heat generated by the gas cooled nuclear reactor 102 may be converted to electrical energy using a first thermoelectric device optimized for a first range of operating characteristics, a second thermoelectric device optimized for a second range of operating characteristics, and up to and including a Nth device optimized for a Nth range of operating characteristics. For instance, the nuclear reactor generated heat may be converted to electrical energy using a first thermoelectric device with a maximum efficiency between approximately 200° and 300° C., a second thermoelectric device with a maximum efficiency between approximately 400° and 500° C., and a third thermoelectric device with a maximum efficiency between approximately 500° and 600° C.

In an embodiment, the heat generated by the gas cooled nuclear reactor 102 may be converted to electrical energy using one or more than one thermoelectric device sized to meet a selected operational requirement 252 of the gas cooled nuclear reactor system 100. For example, the thermoelectric device may be sized to partially match the heat rejection of the thermoelectric device with a portion of the heat produced by the gas cooled nuclear reactor system 100. For instance, the thermoelectric device may be sized by adding or subtracting the number of thermoelectric junctions 238 used in the thermoelectric device 104. By way of further example, the thermoelectric device may be sized to match the power requirements of a selected operation system 106. For instance, the thermoelectric device may be sized to match in full or in part the power requirements of one or more than one of the following gas cooled nuclear reactor 100 operation systems 106: a coolant system 124, a control system 116, a shutdown system 134, a monitoring system 122, or a warning system 136.

Figure 3:
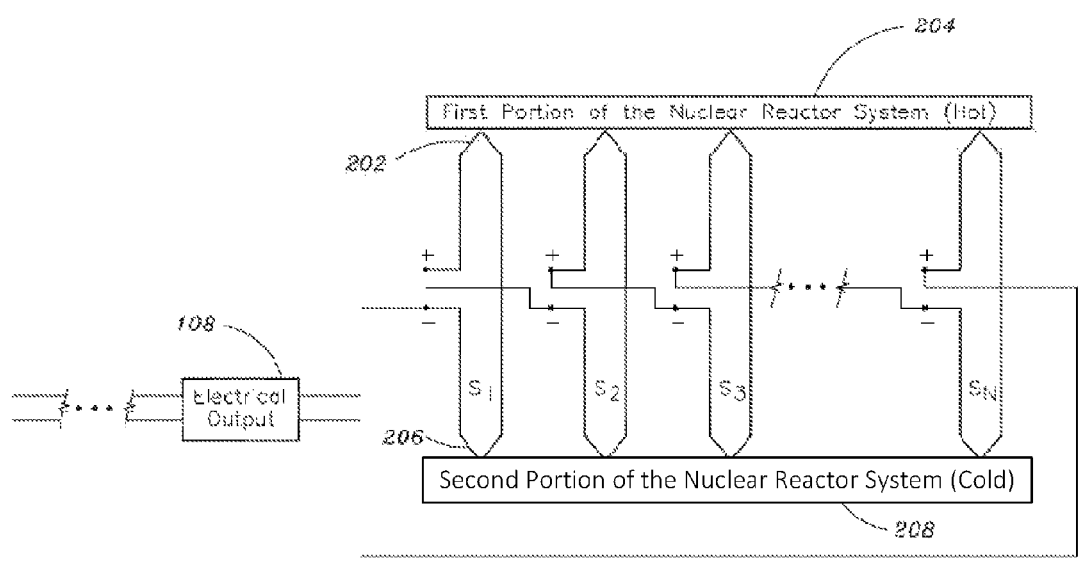
FIG. 3 is a schematic illustrating the series coupling of two or more devices suitable for the thermoelectric conversion of gas cooled nuclear reactor generated heat to electrical energy.

In another embodiment, illustrated in FIG. 3, the heat generated by the gas cooled nuclear reactor 102 may be converted to electrical energy using two or more series coupled thermoelectric devices 104. For example, the heat generated by the gas cooled nuclear reactor 102 may be converted to electrical energy using a first thermoelectric device $S_1$ and a second thermoelectric device $S_2$, where the first thermoelectric device $S_1$ and the second thermoelectric device $S_2$ are electrically coupled in series. By way of further example, the heat generated by the gas cooled nuclear reactor 102 may be converted to electrical energy using a first thermoelectric device $S_1$, a second thermoelectric device $S_2$, a third thermoelectric device $S_3$, and up to and including an Nth thermoelectric device $S_N$, where the first thermoelectric device $S_1$, the second thermoelectric device $S_2$, the third thermoelectric device $S_3$, and the Nth thermoelectric device $S_N$ are electrically coupled in series.

Figure 4:
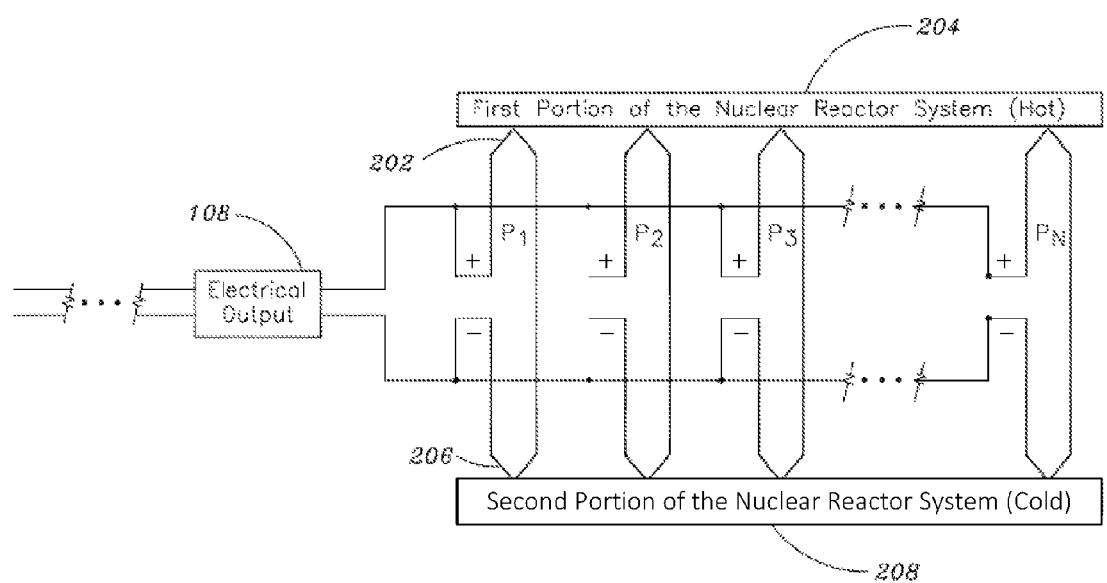
FIG. 4 is a schematic illustrating the parallel coupling of two or more devices suitable for the thermoelectric conversion of gas cooled nuclear reactor generated heat to electrical energy.

In another embodiment, illustrated in FIG. 4, the heat generated by the gas cooled nuclear reactor 102 may be converted to electrical energy using two or more parallel coupled thermoelectric devices 104. For example, the heat generated by the gas cooled nuclear reactor 102 may be converted to electrical energy using a first thermoelectric device $P_1$ and a second thermoelectric device $P_2$, where the first thermoelectric device $P_1$ and the second thermoelectric device $P_2$ are electrically coupled in parallel. By way of further example, the heat generated by the gas cooled nuclear reactor 102 may be converted to electrical energy using a first thermoelectric device $P_1$, a second thermoelectric device $P_2$, a third thermoelectric device $P_3$, and up to and including an Nth thermoelectric device $P_N$, where the first thermoelectric device $P_1$, the second thermoelectric device $P_2$, the third thermoelectric device $P_3$, and the Nth thermoelectric device $P_N$ are electrically coupled in parallel.

Figure 5:
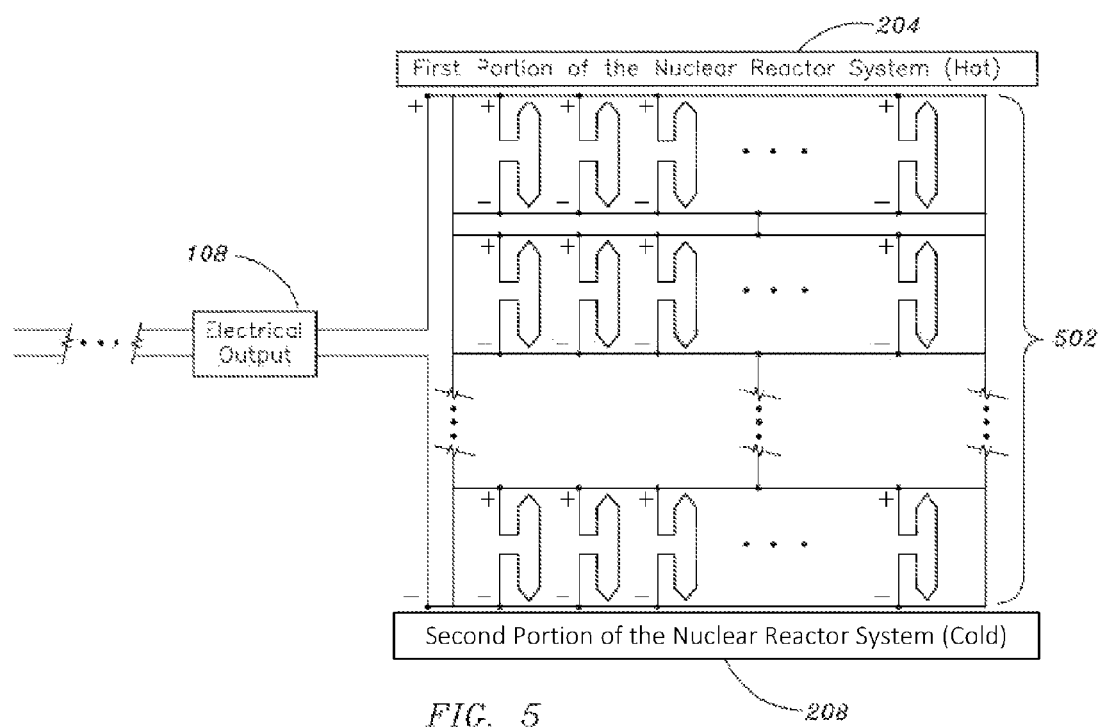
FIG. 5 is a schematic illustrating a thermoelectric module suitable for the thermoelectric conversion of gas cooled nuclear reactor generated heat to electrical energy.

In another embodiment, illustrated in FIG. 5, the heat generated by the gas cooled nuclear reactor 102 may be converted to electrical energy using one or more than one thermoelectric module 502. For example, a thermoelectric module in thermal communication with the gas cooled nuclear reactor system 100 (e.g., the first portion of a thermoelectric module in thermal communication with a heat source 210 and the second portion of a thermoelectric module in thermal communication with an environmental reservoir 234) may convert gas cooled nuclear reactor generated heat to electrical energy. For example, the thermoelectric module 502 may comprise a prefabricated network of parallel coupled thermoelectric devices, series coupled thermoelectric devices, and combinations of parallel coupled and series coupled thermoelectric devices. By way of further example, a thermoelectric module 502 may include a first set of parallel coupled thermoelectric devices, a second set of parallel coupled thermoelectric devices, and up to and including a Mth set of parallel coupled thermoelectric devices, where the first set of devices, the second set of devices, and the Mth set of devices are electrically coupled in series. By way of further example, a thermoelectric module 502 may include a first set of series coupled thermoelectric devices, a second set of series coupled thermoelectric devices, and up to and including a Mth set of series coupled thermoelectric devices, where the first set of devices, the second set of devices, and the Mth set of devices are electrically coupled in parallel.

Figure 6:
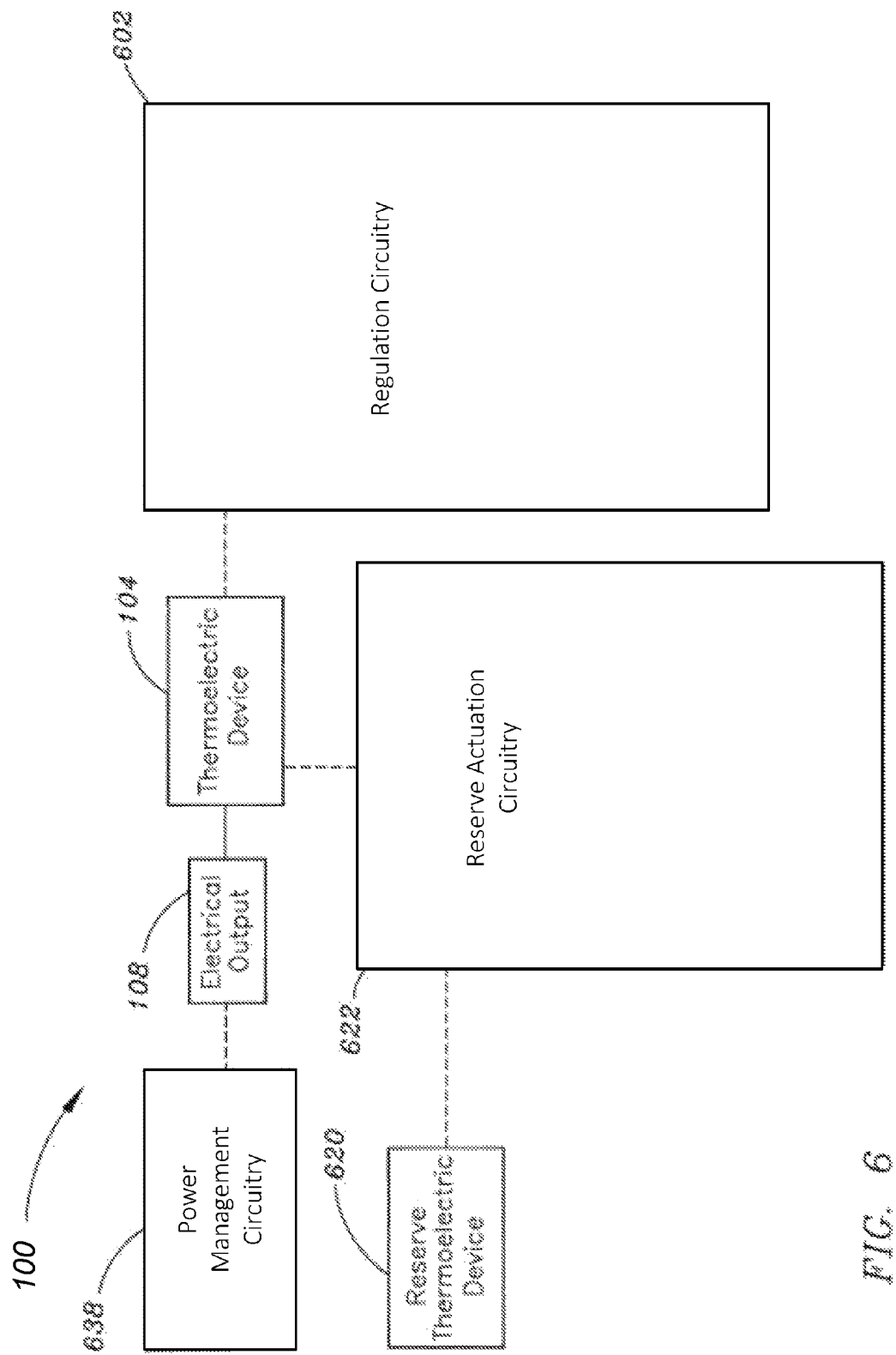
FIG. 6 is a schematic illustrating regulation circuitry coupled to a thermoelectric device for protecting the thermoelectric device, power management circuitry coupled to the output of the thermoelectric device for modifying the electrical output of the thermoelectric device, and a reserve thermoelectric device, activated by reserve actuation circuitry, for augmenting the thermoelectric device.

In certain embodiments, as illustrated in FIG. 6, the thermoelectric device 104 used to convert heat produced by the gas cooled nuclear reactor system 100 to electrical energy may be protected via regulation circuitry 602, such as voltage regulation circuitry (e.g., voltage regulator), current limiting circuitry (e.g., blocking diode or fuse), or bypass circuitry (e.g., bypass diode or active bypass circuitry). For example, the regulation circuitry 602 used to protect the thermoelectric device 104 may include a fuse, wherein the fuse is used to limit current from passing through a short-circuited portion of a set of two or more thermoelectric devices 104. In a further embodiment, bypass circuitry configured to actively electrically bypass one or more than one thermoelectric device 104 may be used to protect one or more than one thermoelectric device 104. For example, the bypass circuitry configured to actively electrically bypass a thermoelectric device 104 may include, but is not limited to, an electromagnetic relay system, a solid state relay system, a transistor, or a microprocessor controlled relay system. By way of further example, the microprocessor controlled relay system used to electrically bypass a thermoelectric device 104 may be responsive to an external parameter (e.g., signal from an operator) or an internal parameter (e.g., amount of current flowing through a specified thermoelectric device).

In another embodiment, one or more than one thermoelectric device 104 used to convert heat produced by the gas cooled nuclear reactor system 100 to electrical energy may be augmented by one or more than one reserve thermoelectric device 620 (e.g., a thermoelectric junction or a thermoelectric module) and reserve actuation circuitry 622. For example, the electrical output 108 of one or more than one thermoelectric device 104 may be augmented using the output of one or more than one reserve thermoelectric device 620, where the one or more than one reserve thermoelectric device may be selectively coupled to one or more than one thermoelectric device 104 using reserve actuation circuitry 622. By way of further example, in the event a first thermoelectric device 104 of a set of thermoelectric devices fails, a reserve thermoelectric device 620 may be coupled to the set of thermoelectric devices in order to augment the output of the set of thermoelectric devices. By way of further example, the reserve actuation circuitry 622 used to selectively couple the one or more than one reserve thermoelectric device 620 with the one or more than one thermoelectric device 104 may include, but is not limited to, a relay system, an electromagnetic relay system, a solid state relay system, a transistor, a microprocessor controlled relay system, a microprocessor controlled relay system programmed to respond to an external parameter (e.g., required electrical power output of nuclear reactor system 100 or availability of external electric grid power), or a microprocessor controlled relay system programmed to respond to an internal parameter (e.g., output of one or more than one thermoelectric device 104).

In another embodiment, the electrical output 108 of one or more than one thermoelectric device 104 used to convert heat produced by the gas cooled nuclear reactor system 100 to electrical energy may be modified using power management circuitry 638. For example, the power management circuitry 638 used to modify the electrical output 108 of a thermoelectric device 104 may include, but is not limited to, a power converter, voltage converter (e.g., a DC-DC converter or a DC-AC inverter), or voltage regulation circuitry. By way of further example, the voltage regulation circuitry used to modify the electrical output 108 of a thermoelectric device 104 may include, but is not limited to, a Zener diode, a series voltage regulator, a shunt regulator, a fixed voltage regulator or an adjustable voltage regulator.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 7:
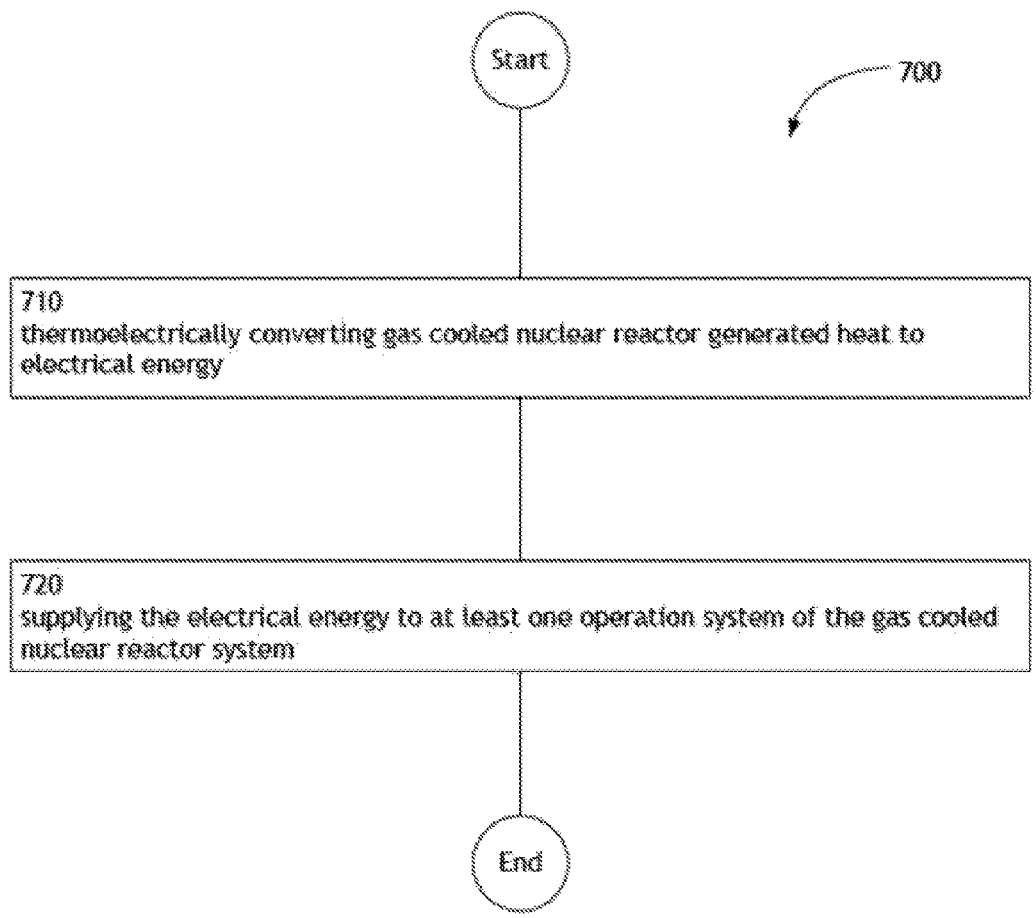
FIG. 7 is a high-level flowchart of a method for thermoelectrically converting gas cooled nuclear reactor generated heat to electrical energy.

FIG. 7 illustrates an operational flow 700 representing example operations related to the thermoelectric conversion of gas cooled nuclear reactor generated heat to electrical energy. In FIG. 7 and in following figures that include various examples of operational flows, discussion and explanation may be provided with respect to the above-described examples of FIGS. 1 through 6, and/or with respect to other examples and contexts. However, it should be understood that the operational flows may be executed in a number of other environments and contexts, and/or in modified versions of FIGS. 1 through 6. Also, although the various operational flows are presented in the sequence(s) illustrated, it should be understood that the various operations may be performed in other orders than those which are illustrated, or may be performed concurrently.

After a start operation, the operational flow 700 moves to a converting operation 710. Operation 710 depicts thermoelectrically converting gas cooled nuclear reactor generated heat to electrical energy. For example, as shown in FIG. 1, a thermoelectric device 104 may convert heat produced by a gas cooled nuclear reactor system 100 to electrical energy.

Then, supplying operation 720 depicts supplying the electrical energy to at least one operation system of the gas cooled nuclear reactor system. For example, as shown in FIG. 1, the electrical output 108 of a thermoelectric device 104 may be used to supply electrical energy to an operation system 106 of the gas cooled nuclear reactor system 100.

Figure 8:
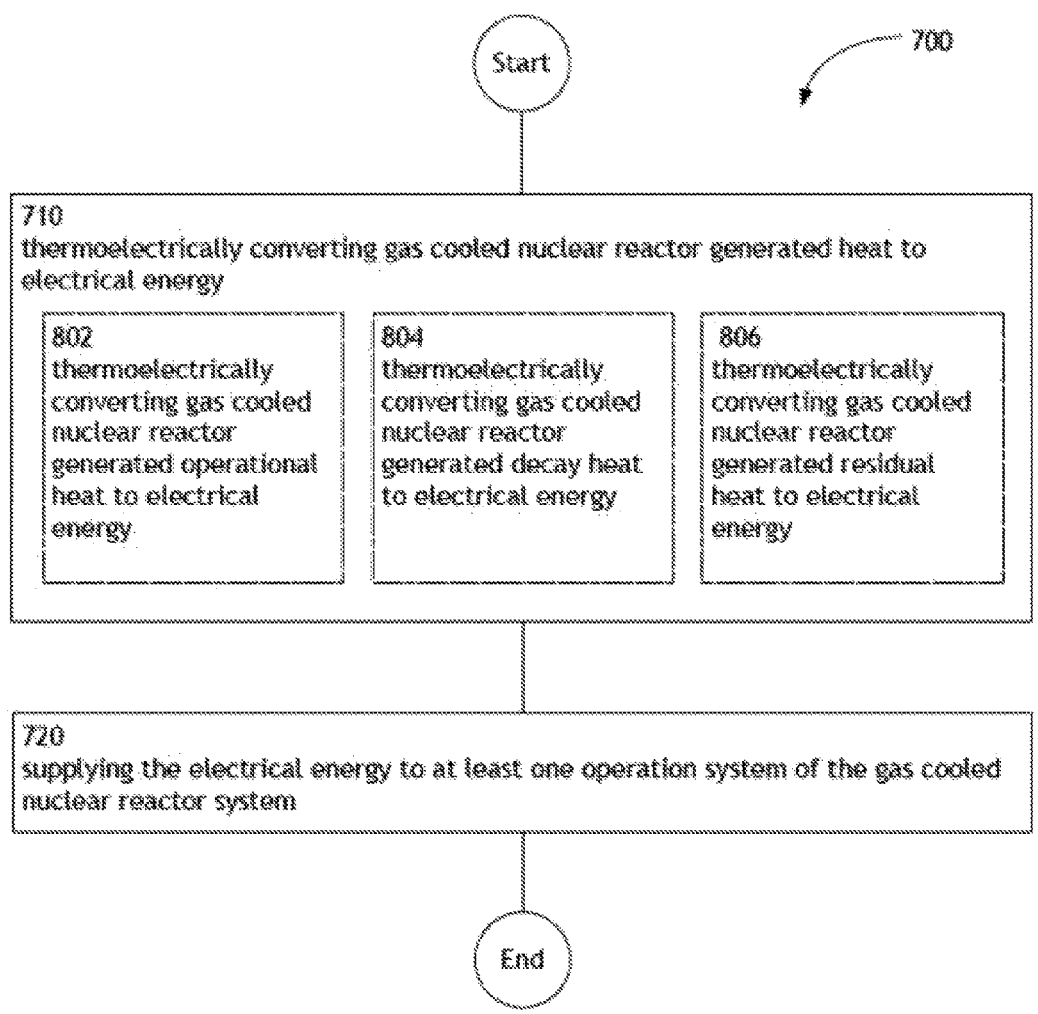
FIGS. 8 through 27 are high-level flowcharts depicting alternate implementations of FIG. 7.

FIG. 8 illustrates alternative embodiments of the example operational flow 700 of FIG. 7. FIG. 8 illustrates example embodiments where the converting operation 710 may include at least one additional operation. Additional operations may include an operation 802, an operation 804, and/or an operation 806.

At operation 802, gas cooled nuclear reactor generated operational heat may be thermoelectrically converted to electrical energy. For example, as shown in FIGS. 1 through 6, a thermoelectric device 104 may convert operational heat produced by the gas cooled nuclear reactor system 100 to electrical energy.

At operation 804, gas cooled nuclear reactor generated decay heat may be thermoelectrically converted to electrical energy. For example, as shown in FIGS. 1 through 6, a thermoelectric device 104 may convert radioactive decay heat produced by the gas cooled nuclear reactor system 100 to electrical energy.

At operation 806, gas cooled nuclear reactor generated residual heat may be thermoelectrically converted to electrical energy. For example, as shown in FIGS. 1 through 6, a thermoelectric device 104 may convert residual heat produced by the gas cooled nuclear reactor system 100 to electrical energy.

Figure 9:
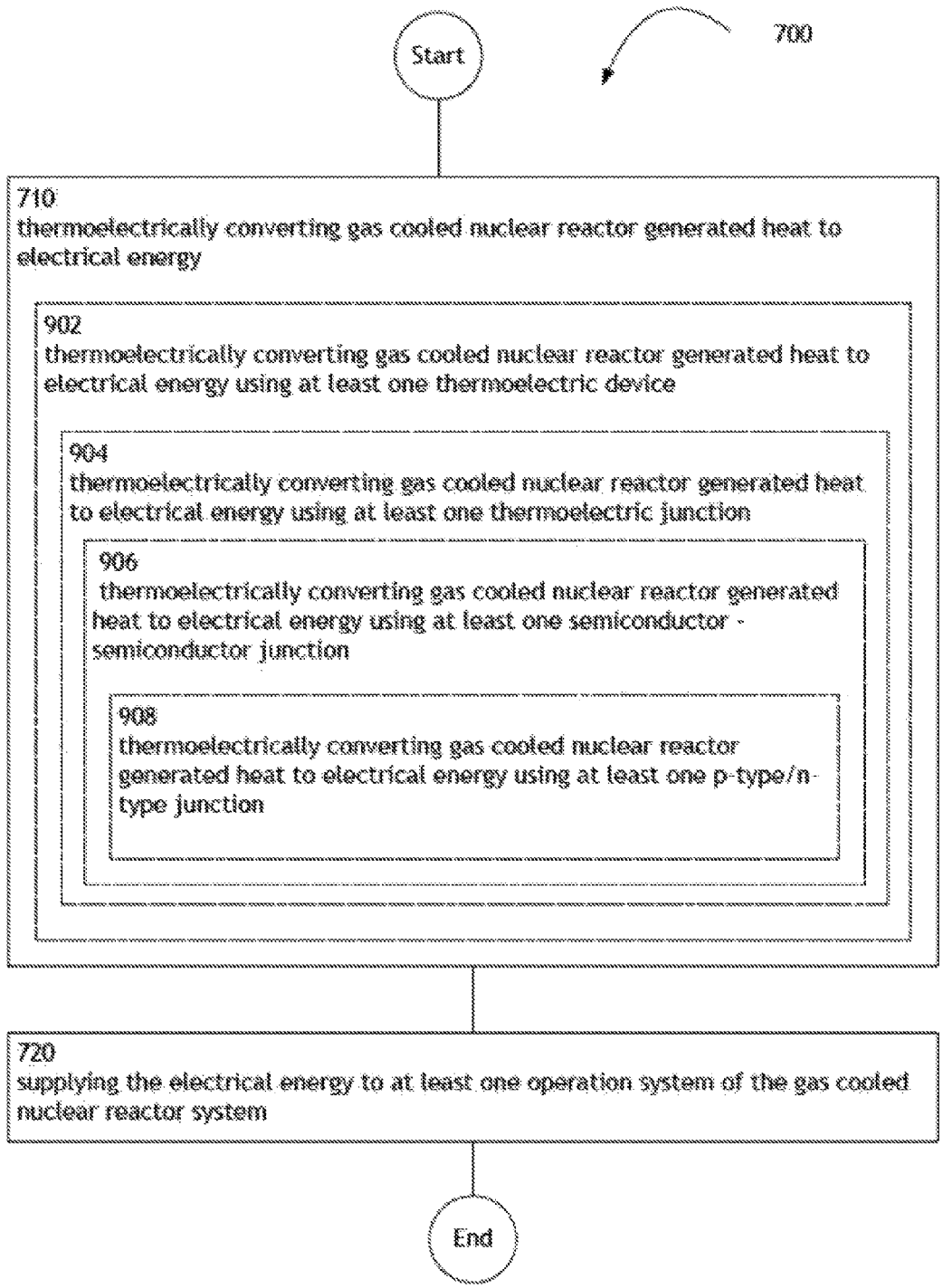

FIG. 9 illustrates alternative embodiments of the example operational flow 700 of FIG. 7. FIG. 9 illustrates example embodiments where the converting operation 710 may include at least one additional operation. Additional operations may include an operation 902, an operation 904, an operation 906, and/or an operation 908.

At operation 902, gas cooled nuclear reactor generated heat may be converted to electrical energy using at least one thermoelectric device. For example, as shown in FIGS. 1 through 6, a thermoelectric device 104 placed in thermal communication with the gas cooled nuclear reactor system 100 may convert heat produced by the gas cooled nuclear reactor system 100 to electrical energy.

Further, the operation 904 illustrates thermoelectrically converting gas cooled nuclear reactor generated heat to electrical energy using at least one thermoelectric junction. For example, as shown in FIG. 2, the thermoelectric device may comprise a thermoelectric junction 238 (e.g., thermocouple). For instance, a thermoelectric junction 238 placed in thermal communication with the gas cooled nuclear reactor system 100 may convert heat produced by the gas cooled nuclear reactor system 100 to electrical energy.

Further, the operation 906 illustrates thermoelectrically converting gas cooled nuclear reactor generated heat to electrical energy using at least one semiconductor—semiconductor junction. For example, as shown in FIG. 2, the thermoelectric device 104 may comprise a semiconductor-semiconductor thermoelectric junction 240 (e.g., p-type/p-type junction of different semiconductor materials). For instance, a semiconductor-semiconductor thermoelectric junction 238 placed in thermal communication with the gas cooled nuclear reactor system 100 may convert heat produced by the gas cooled nuclear reactor system 100 to electrical energy.

Further, the operation 908 illustrates thermoelectrically converting gas cooled nuclear reactor generated heat to electrical energy using at least one p-type/n-type junction. For example, as shown in FIG. 2, the thermoelectric device 104 may comprise a p-type/n-type semiconductor junction 242 (e.g., p-doped bismuth telluride/n-doped bismuth telluride junction). For instance, a p-type/n-type semiconductor junction 242 placed in thermal communication with the gas cooled nuclear reactor system 100 may convert heat produced by the gas cooled nuclear reactor system 100 to electrical energy.

Figure 10:
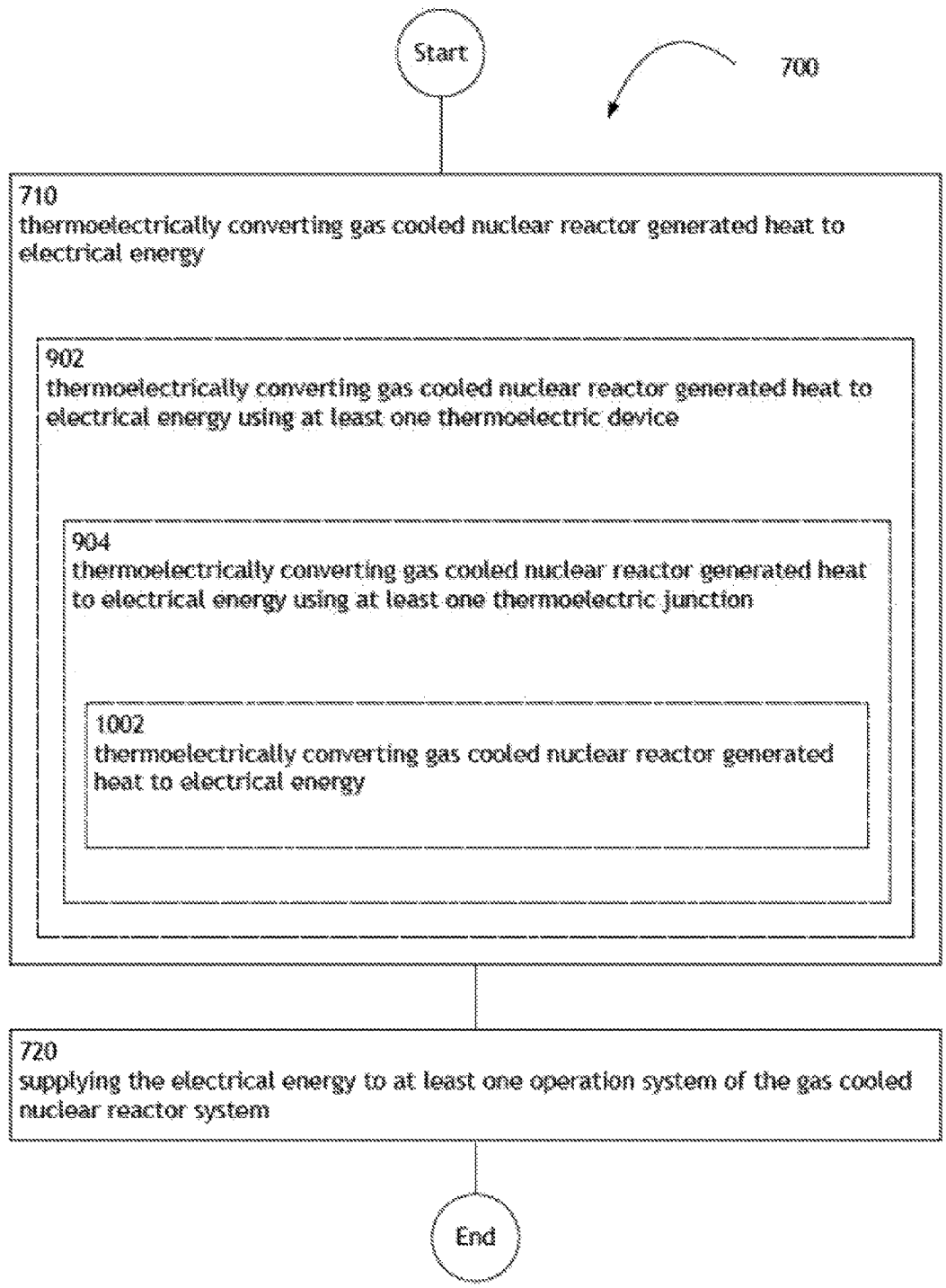

FIG. 10 illustrates alternative embodiments of the example operational flow 700 of FIG. 7. FIG. 10 illustrates example embodiments where the converting operation 710 may include at least one additional operation. Additional operations may include an operation 1002.

Further, at operation 1002, gas cooled nuclear reactor generated heat may be converted to electrical energy using at least one metal-metal junction. For example, as shown in FIG. 2, the thermoelectric device 104 may comprise a metal-metal thermoelectric junction 244 (e.g., copper-constantan junction). For instance, a metal-metal thermoelectric junction 244 placed in thermal communication with the gas cooled nuclear reactor system 100 may convert heat produced by the gas cooled nuclear reactor system 100 to electrical energy.

Figure 11:
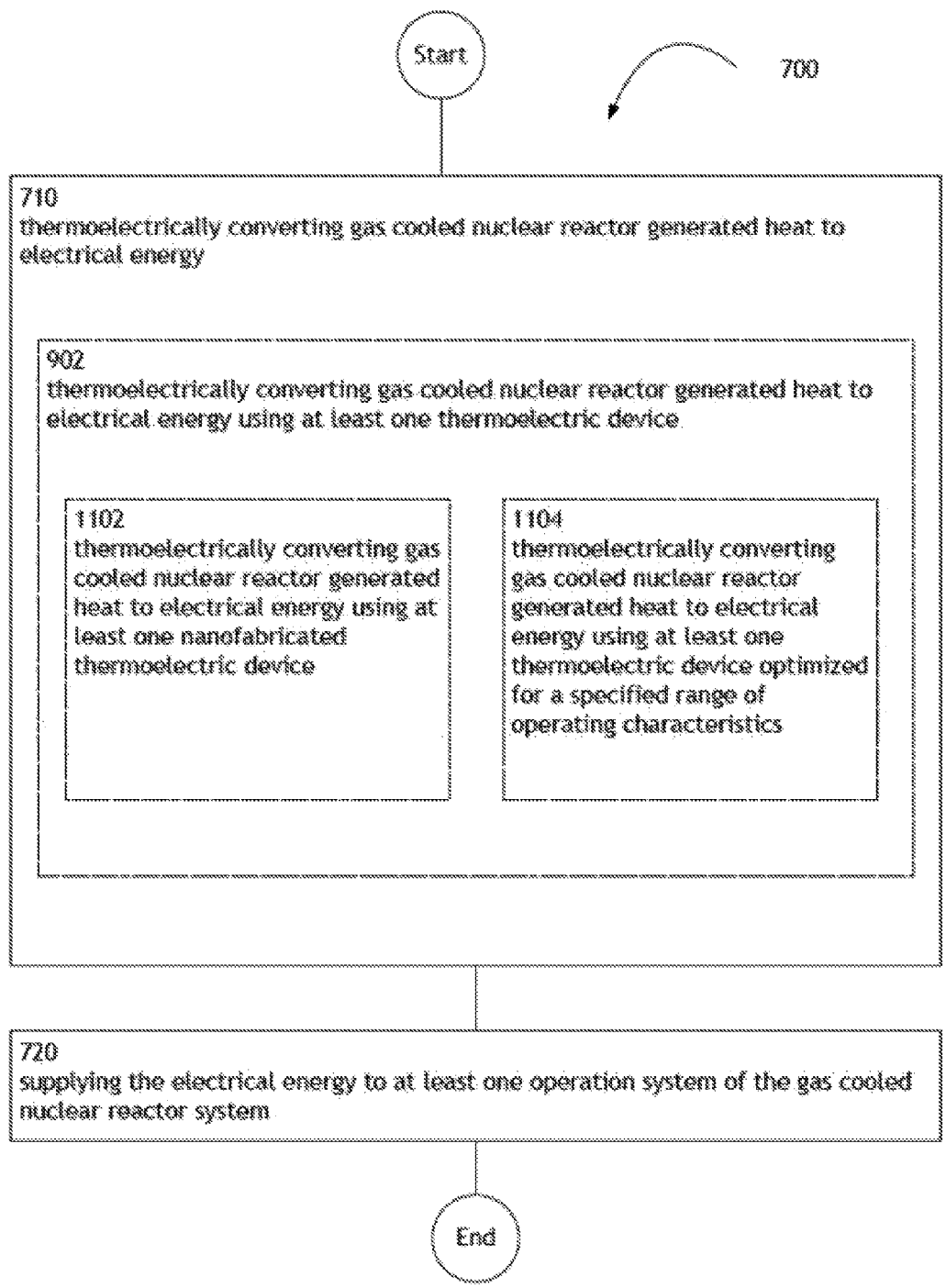

FIG. 11 illustrates alternative embodiments of the example operational flow 700 of FIG. 7. FIG. 11 illustrates example embodiments where the converting operation 710 may include at least one additional operation. Additional operations may include an operation 1102, and/or an operation 1104.

Further, at operation 1102, gas cooled nuclear reactor generated heat may be converted to electrical energy using at least one nanofabricated thermoelectric device. For example, as shown in FIG. 2, the thermoelectric device 104 may comprise a nanofabricated thermoelectric device 246 (e.g., thermoelectric device constructed partially from a nanowire material, a super lattice material, or a quantum dot material). For instance, a nanofabricated thermoelectric device 246 placed in thermal communication with the gas cooled nuclear reactor system 100 may convert heat produced by the gas cooled nuclear reactor system 100 to electrical energy.

Further, at operation 1104, gas cooled nuclear reactor generated heat may be converted to electrical energy using at least one thermoelectric device optimized for a specified range of operating characteristics. For example, as shown in FIG. 2, the thermoelectric device 104 may comprise a thermoelectric device optimized for a specified range of operating characteristics 248 (e.g., range of temperature or range of pressure). For instance, a thermoelectric device optimized for a specified range of operating characteristics 248 placed in thermal communication with the gas cooled nuclear reactor system 100 may convert heat produced by the gas cooled nuclear reactor system 100 to electrical energy.

Figure 12:
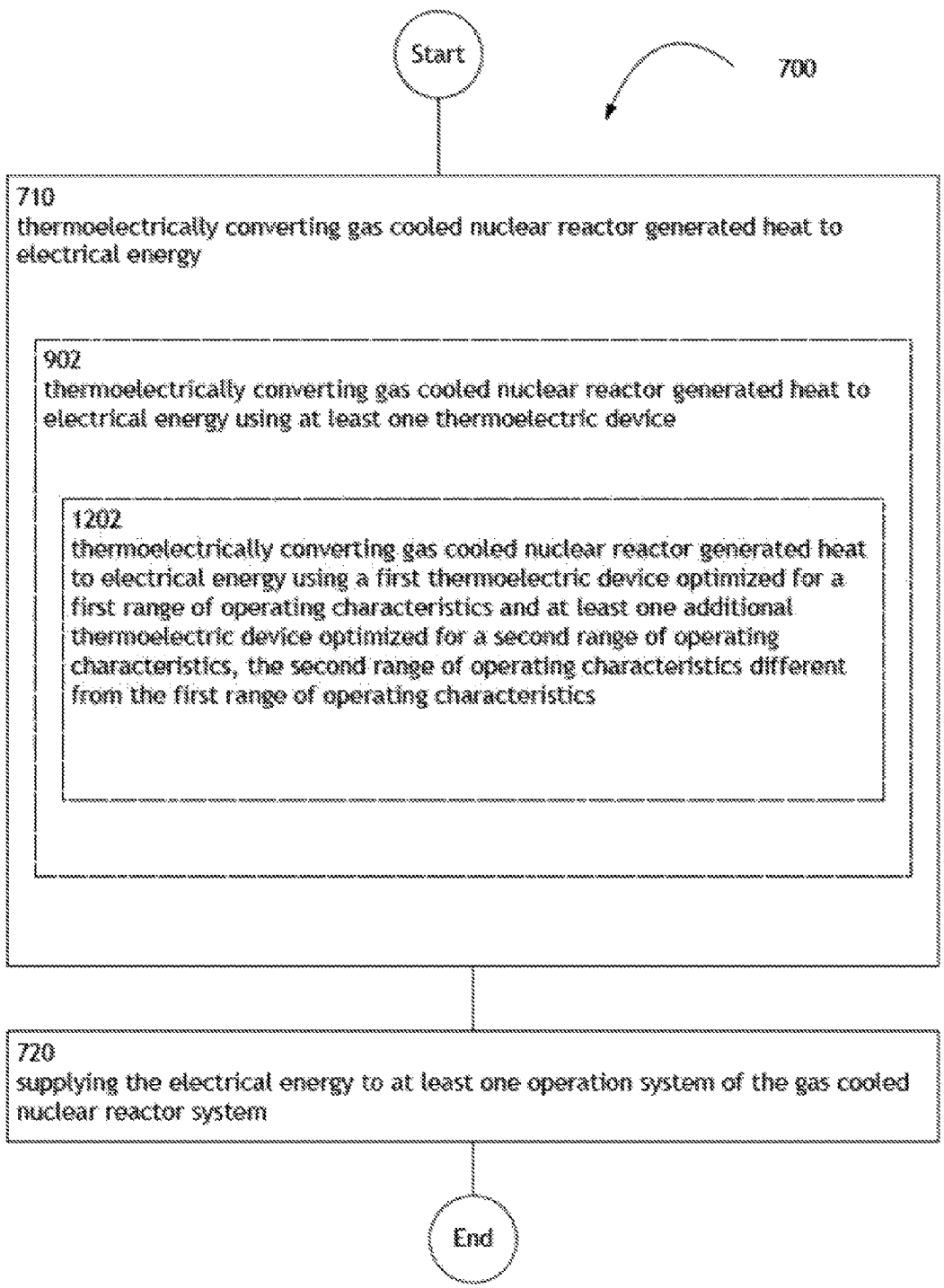

FIG. 12 illustrates alternative embodiments of the example operational flow 700 of FIG. 7. FIG. 12 illustrates example embodiments where the converting operation 710 may include at least one additional operation. Additional operations may include an operation 1202.

Further, at operation 1202, gas cooled nuclear reactor generated heat may be converted to electrical energy using a first thermoelectric device optimized for a first range of operating characteristics and at least one additional thermoelectric device optimized for a second range of operating characteristics, the second range of operating characteristics different from the first range of operating characteristics. For example, as shown in FIG. 2, a first thermoelectric device optimized for a first range of operating characteristics and a second thermoelectric device optimized for a second range of operating characteristics 250, wherein the first range of operating characteristics is different from the second range of operating characteristics, may both be placed in thermal communication with the gas cooled nuclear reactor system 100. Then, the first thermoelectric device and the second thermoelectric device 250 may convert heat produced by the gas cooled nuclear reactor system 100 to electrical energy.

Figure 13:
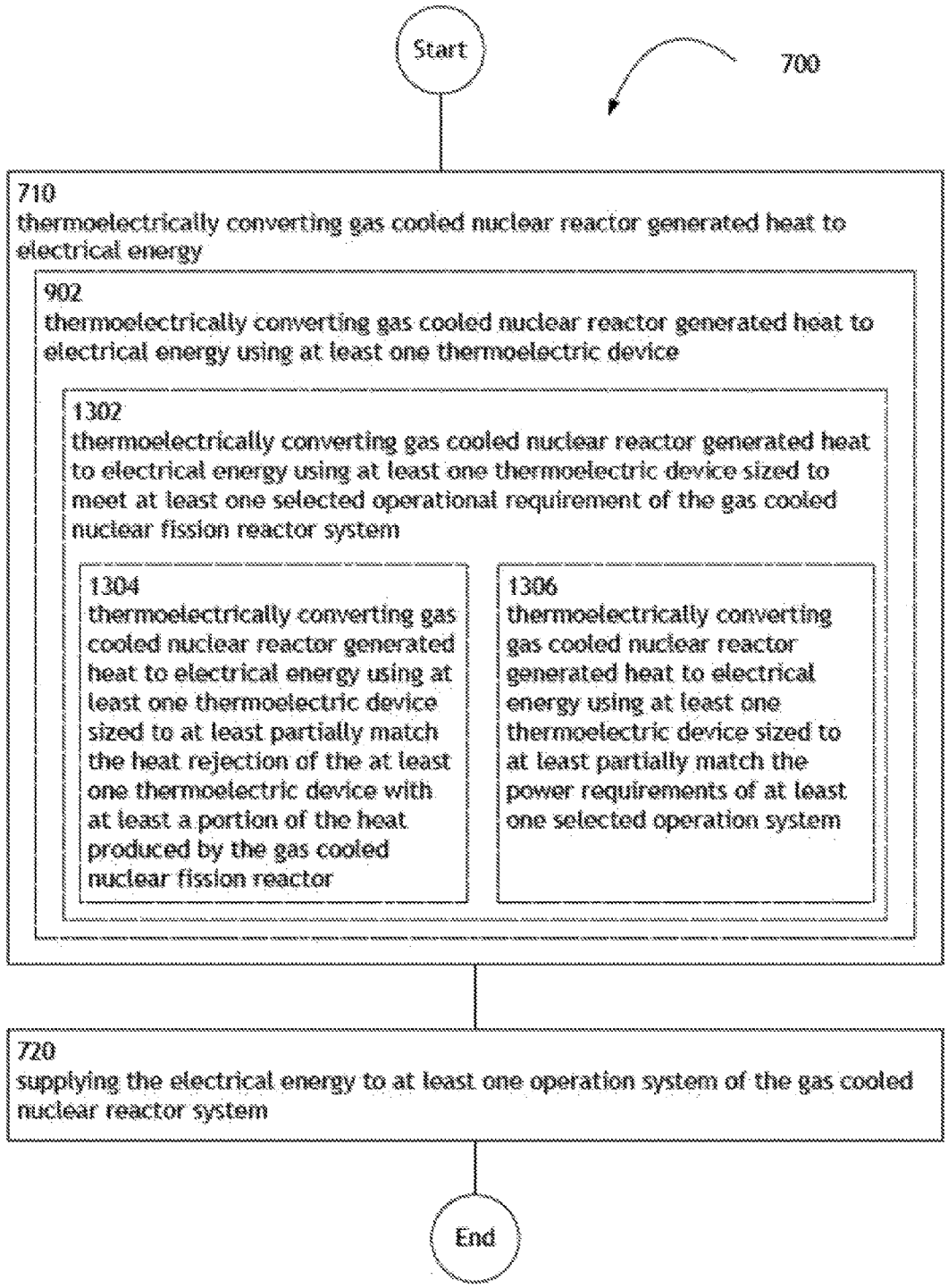

FIG. 13 illustrates alternative embodiments of the example operational flow 700 of FIG. 7. FIG. 13 illustrates example embodiments where the converting operation 710 may include at least one additional operation. Additional operations may include an operation 1302, an operation 1304, and/or an operation 1306.

Further, operation 1302 illustrates thermoelectrically converting gas cooled nuclear reactor generated heat to electrical energy using at least one thermoelectric device sized to meet at least one selected operational requirement of the gas cooled nuclear fission reactor system. For example, as shown in FIG. 2, a thermoelectric device 104 sized to meet an operational requirement 252 (e.g., electric power demand) of the gas cooled nuclear reactor system 100 may convert heat produced by the gas cooled nuclear reactor system 100 to electrical energy.

Further, the operation 1304 illustrates thermoelectrically converting nuclear reactor generated heat to electrical energy using at least one thermoelectric device sized to at least partially match the heat rejection of the at least one thermoelectric device with at least a portion of the heat produced by the gas cooled nuclear reactor. For example, as shown in FIG. 2, a thermoelectric device 104 sized to match the heat rejection 254 of the thermoelectric device with the heat produced by the gas cooled nuclear reactor 102 of the gas cooled nuclear reactor system 100 may convert heat produced by the gas cooled nuclear reactor system 100 to electrical energy.

Further, the operation 1306 illustrates thermoelectrically converting gas cooled nuclear reactor generated heat to electrical energy using at least one thermoelectric device sized to at least partially match the power requirements of at least one selected operation system. For example, as shown in FIG. 2, a thermoelectric device 104 sized to match the power requirements of a selected operation system 256 (e.g., match the power requirements of a coolant system, a control system, a shutdown system, a monitoring system, a warning system or a security system) of the gas cooled nuclear reactor system 100 may convert heat produced by the gas cooled nuclear reactor system 100 to electrical energy.

Figure 14A:
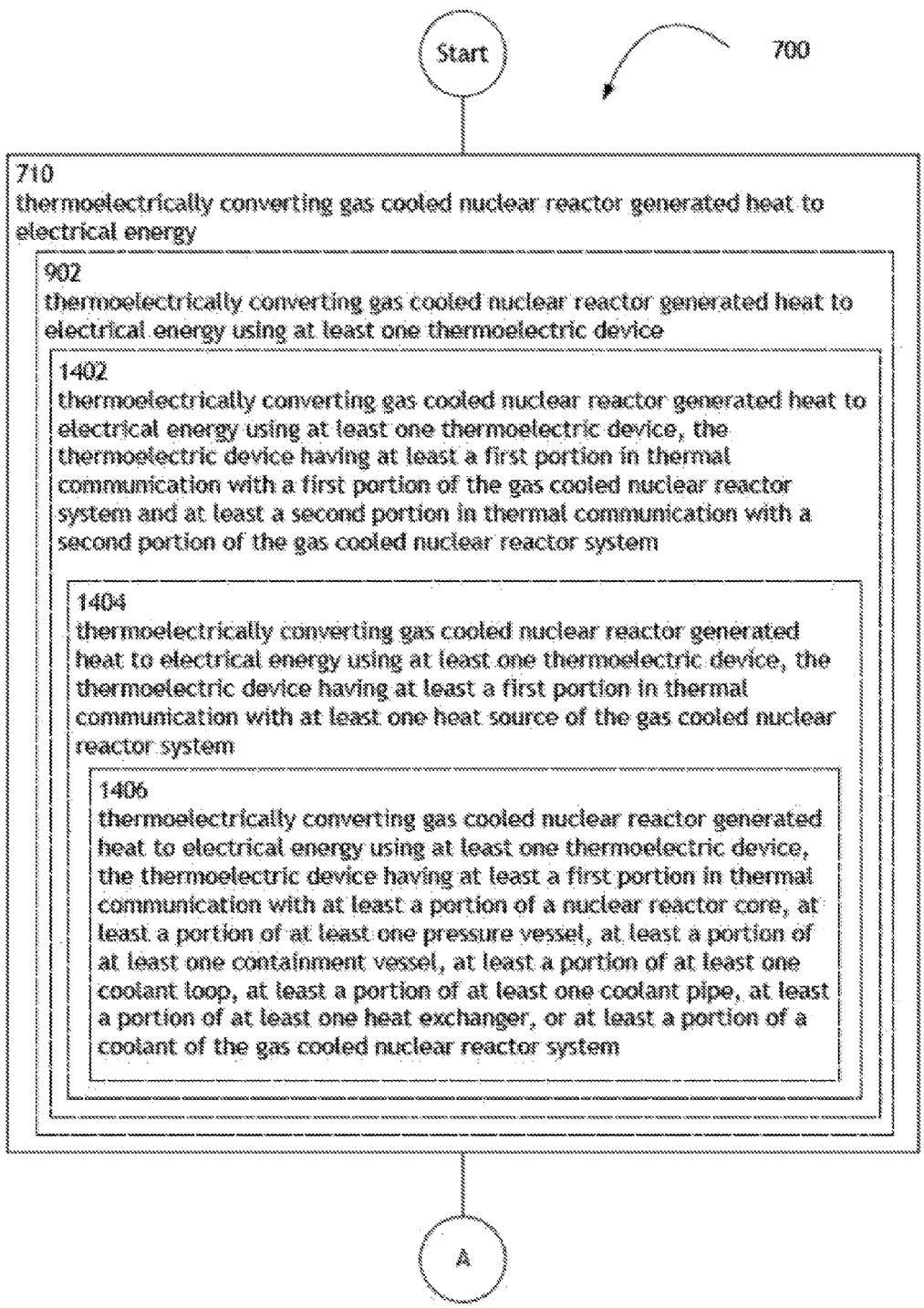
Figure 14B:
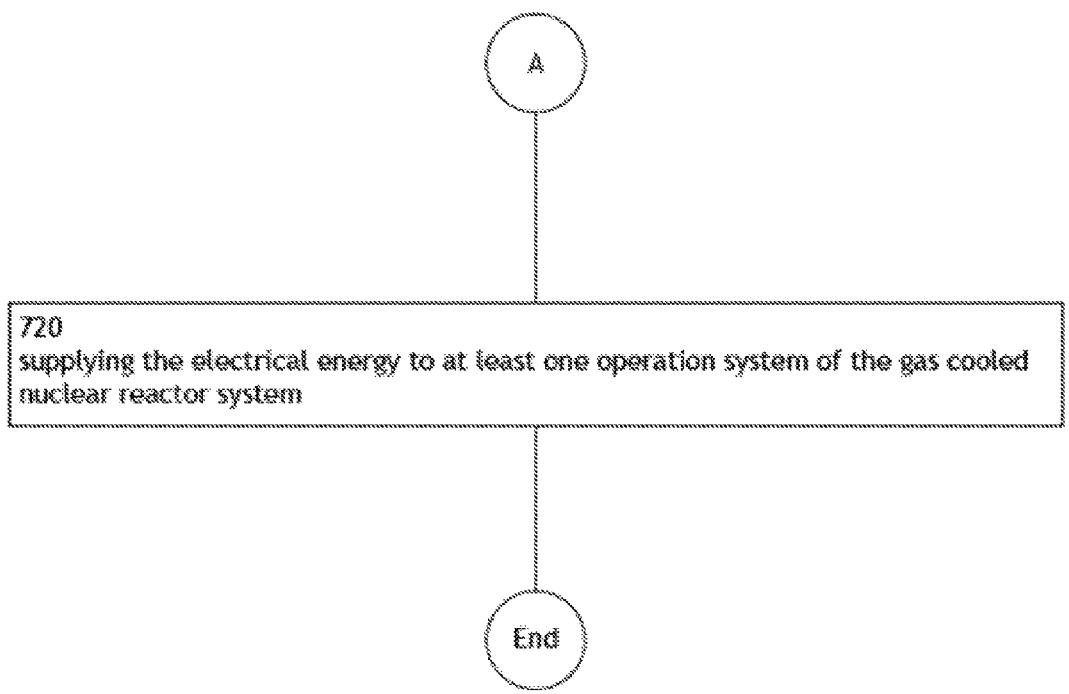

FIG. 14 illustrates alternative embodiments of the example operational flow 700 of FIG. 7. FIG. 14 illustrates example embodiments where the converting operation 710 may include at least one additional operation. Additional operations may include an operation 1402, an operation 1404, and/or an operation 1406.

Further, the operation 1402 illustrates thermoelectrically converting gas cooled nuclear reactor generated heat to electrical energy using at least one thermoelectric device, the thermoelectric device having at least a first portion in thermal communication with a first portion of the gas cooled nuclear reactor system and at least a second portion in thermal communication with a second portion of the gas cooled nuclear reactor system. For example, as shown in FIG. 2, a first portion 202 of a thermoelectric device 104 may be in thermal communication with a first portion 204 of a gas cooled nuclear reactor system 100, while a second portion 206 of the thermoelectric device 104 may be in thermal communication with a second portion 208 of the gas cooled nuclear reactor system. Then, the thermoelectric device 104 may convert heat produced by the gas cooled nuclear reactor system 100 to electrical energy.

Further, the operation 1404 illustrates thermoelectrically converting gas cooled nuclear reactor generated heat to electrical energy using at least one thermoelectric device, the thermoelectric device having at least a first portion in thermal communication with at least one heat source of the gas cooled nuclear reactor system. For example, as shown in FIG. 2, the first portion 204 of the gas cooled nuclear reactor system may comprise a heat source 210 of the gas cooled nuclear reactor system 100. Therefore, a first portion of a thermoelectric device 202 may be in thermal communication with a heat source 210 of the nuclear reactor system 100. Then, the thermoelectric device 104 may convert heat produced by the gas cooled nuclear reactor system 100 to electrical energy.

Further, the operation 1406 illustrates thermoelectrically converting gas cooled nuclear reactor generated heat to electrical energy using at least one thermoelectric device, the thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of a coolant of the gas cooled nuclear reactor system. For example, as shown in FIG. 2, the first portion 204 of the gas cooled nuclear reactor system 100 may include, but is not limited to, a nuclear reactor core 212, a pressure vessel 214 of the gas cooled nuclear reactor system 100, a containment vessel 216 of the gas cooled nuclear reactor system 100, a coolant loop 218 of the gas cooled nuclear reactor system 100, a coolant pipe 220 of the gas cooled nuclear reactor system, a heat exchanger 222 of the gas cooled nuclear reactor system 100 or the coolant 224 of the gas cooled nuclear reactor system 100. By way of further example, a first portion of a thermoelectric device 202 may be in thermal communication with a coolant loop 218 of the nuclear reactor system 100. Then, the thermoelectric device 104 may convert heat produced by the gas cooled nuclear reactor system 100 to electrical energy.

Figure 15A:
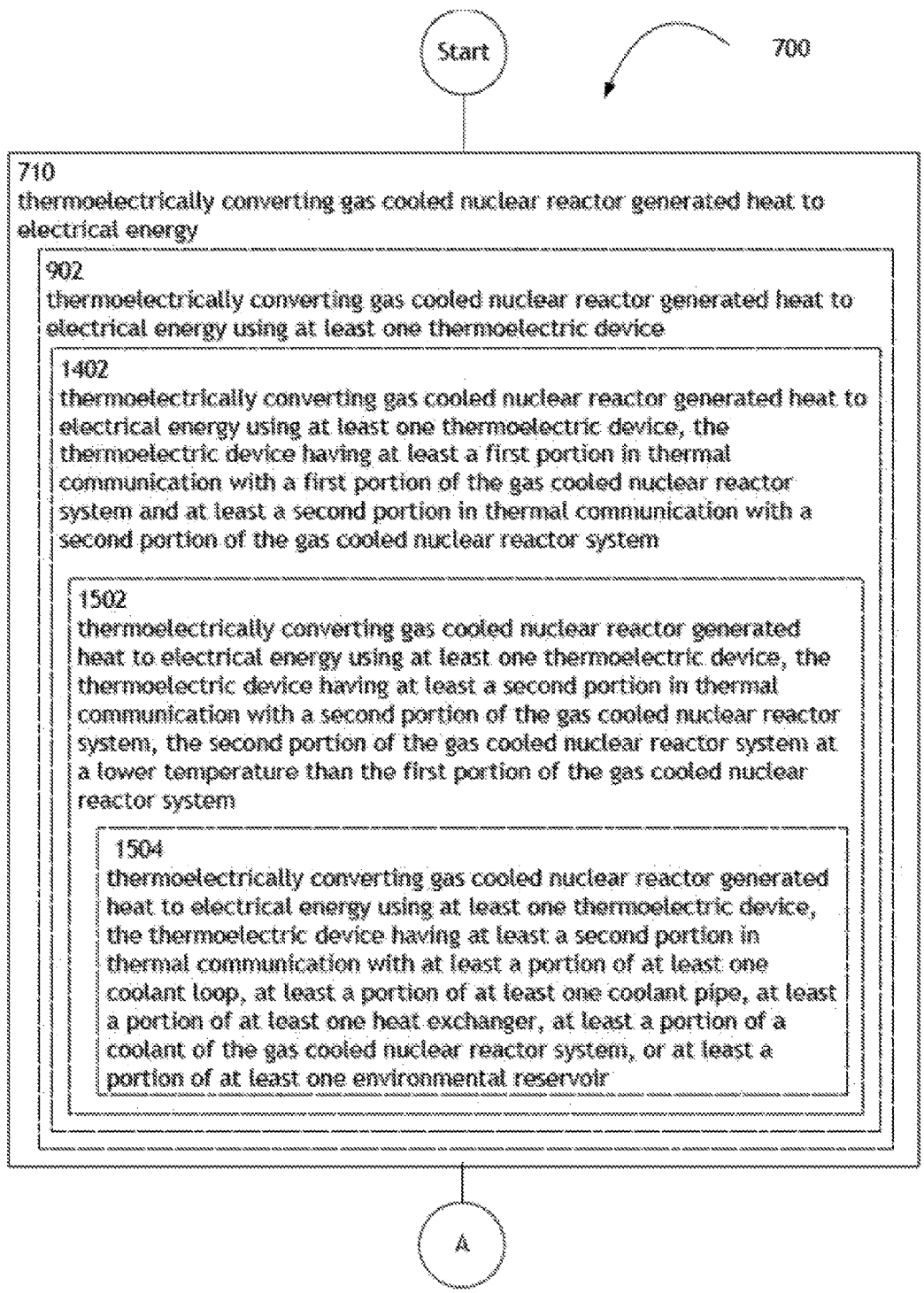
Figure 15B:
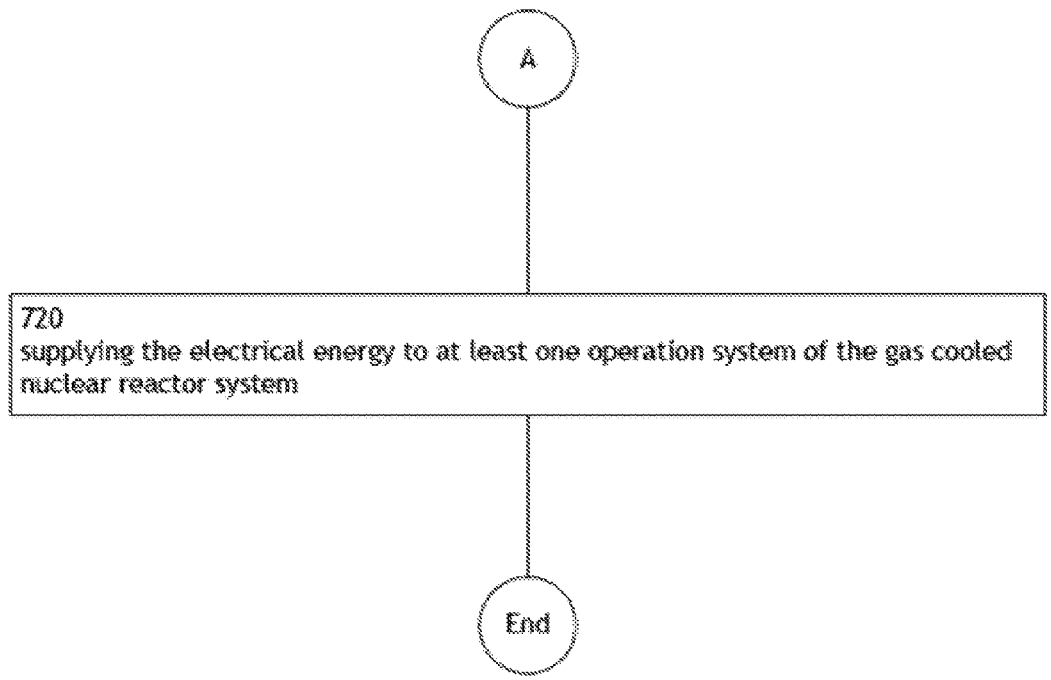

FIG. 15 illustrates alternative embodiments of the example operational flow 700 of FIG. 7. FIG. 15 illustrates example embodiments where the converting operation 710 may include at least one additional operation. Additional operations may include an operation 1502, and/or an operation 1504.

Further, the operation 1502 illustrates thermoelectrically converting gas cooled nuclear reactor generated heat to electrical energy using at least one thermoelectric device, the thermoelectric device having at least a second portion in thermal communication with a second portion of the gas cooled nuclear reactor system, the second portion of the gas cooled nuclear reactor system at a lower temperature than the first portion of the gas cooled nuclear reactor system. For example, as shown in FIG. 2, a second portion 206 of a thermoelectric device 104 may be in thermal communication with a second portion 208 of a gas cooled nuclear reactor system 100, where the second portion 208 of the gas cooled nuclear reactor system 100 is at a lower temperature than the first portion 204 of the gas cooled nuclear reactor system 100. Then, the thermoelectric device 104 may convert heat produced by the gas cooled nuclear reactor system 100 to electrical energy.

Further, the operation 1504 illustrates thermoelectrically converting gas cooled nuclear reactor generated heat to electrical energy using at least one thermoelectric device, the thermoelectric device having at least a second portion in thermal communication with at least a portion of at least one coolant loop, at least a portion of at least one coolant pipe, at least a portion of at least one heat exchanger, at least a portion of a coolant of the gas cooled nuclear reactor system, or at least a portion of at least one environmental reservoir. For example, as shown in FIG. 2, the second portion 208 of the gas cooled nuclear reactor system 100, which is at a temperature lower than the first portion 204 of the gas cooled nuclear reactor system, may include, but is not limited to, a coolant loop 226 of the gas cooled nuclear reactor system 100, a coolant pipe 228 of the gas cooled nuclear reactor system 100, a heat exchanger 230 of the gas cooled nuclear reactor system 100, coolant 232 of the gas cooled nuclear reactor system 100, or an environmental reservoir 234 (e.g., body of water, subterranean structure, or the atmosphere). By way of further example, the second portion 206 of a thermoelectric device 104 may be in thermal communication with a coolant pipe 228 of the gas cooled nuclear reactor system 100, where the coolant pipe 228 is at a temperature lower than the first portion of the gas cooled nuclear reactor system 204. Then, the thermoelectric device 104 may convert heat produced by the gas cooled nuclear reactor system 100 to electrical energy.

Figure 16:
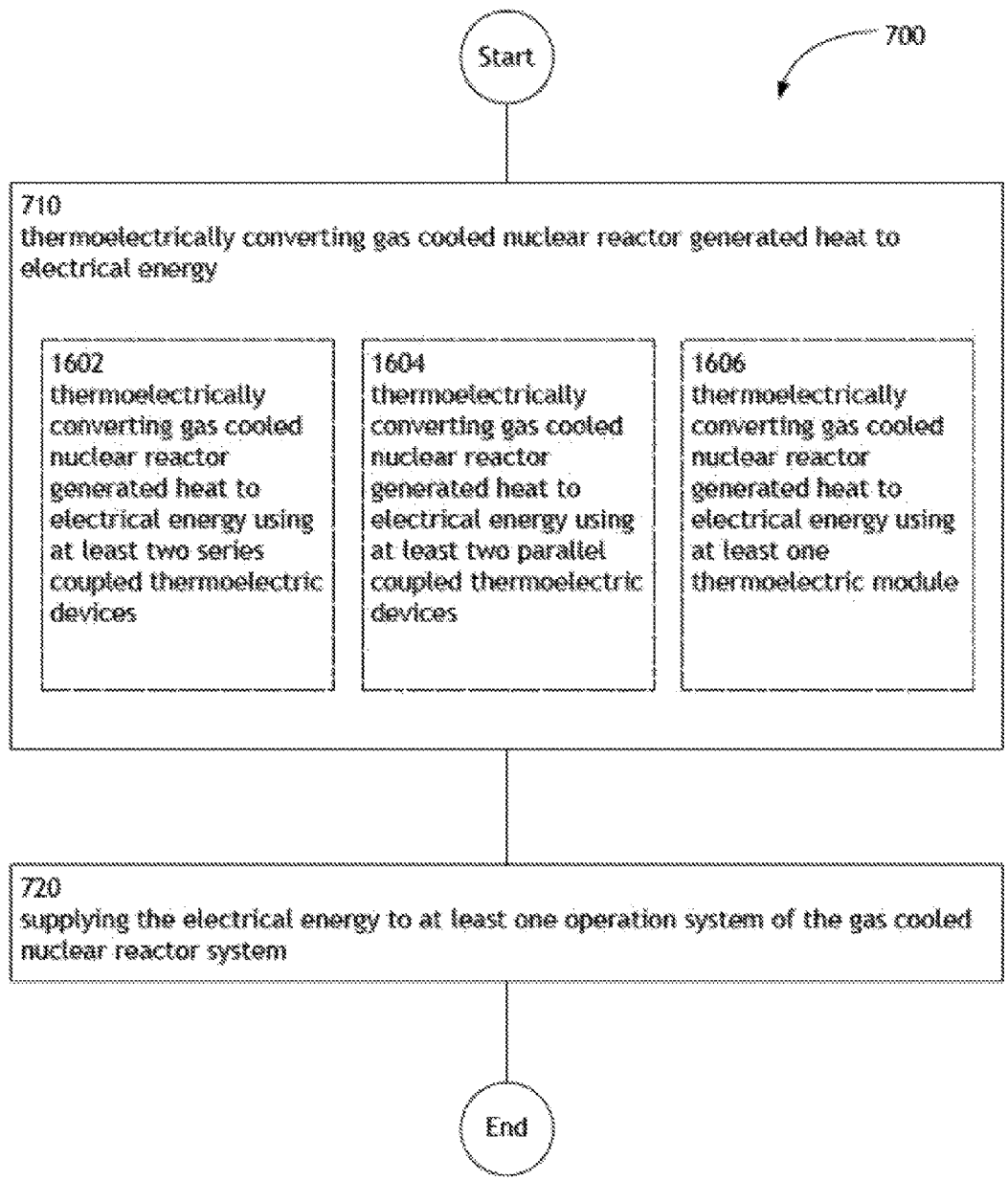

FIG. 16 illustrates alternative embodiments of the example operational flow 700 of FIG. 7. FIG. 16 illustrates example embodiments where the converting operation 710 may include at least one additional operation. Additional operations may include an operation 1602, an operation 1604, and/or an operation 1606.

At operation 1602, gas cooled nuclear reactor generated heat may be converted to electrical energy using at least two series coupled thermoelectric devices. For example, as shown in FIG. 3, a first thermoelectric device $S_1$ electrically coupled in series to a second thermoelectric device $S_2$ may convert heat produced by the gas cooled nuclear reactor system 100 to electrical energy. Further, a first thermoelectric device $S_1$, a second thermoelectric device $S_2$, a third thermoelectric device $S_3$, and up to and including a Nth thermoelectric device $S_N$ may be used to convert gas cooled nuclear reactor generated heat to electric energy, wherein the first thermoelectric device $S_1$, the second thermoelectric device $S_2$, the third thermoelectric device $S_3$, and up to and including the Nth thermoelectric device $S_N$ are series coupled.

At operation 1604, gas cooled nuclear reactor generated heat may be converted to electrical energy using at least two parallel coupled thermoelectric devices. For example, as shown in FIG. 4, a first thermoelectric device $P_1$ electrically coupled in parallel to a second thermoelectric device $P_2$ may convert heat produced by the gas cooled nuclear reactor system 100 to electrical energy. Further, a first thermoelectric device $P_1$, a second thermoelectric device $P_2$, a third thermoelectric device $P_3$, and up to and including a Nth thermoelectric device $P_N$ may be used to convert gas cooled nuclear reactor generated heat to electric energy, where the first thermoelectric device $P_1$ the second thermoelectric device $P_2$, the third thermoelectric device $P_3$, and up to and including the Nth thermoelectric device $P_N$ are parallel coupled.

At operation 1606, gas cooled nuclear reactor generated heat may be converted to electrical energy using at least one thermoelectric module. For example, as shown in FIG. 5, a thermoelectric module 502 (e.g., a thermopile or multiple thermopiles) placed in thermal communication with the gas cooled nuclear reactor system 100 may convert heat produced by the gas cooled nuclear reactor system 100 to electrical energy. For example, a thermoelectric module 502 may comprise a prefabricated network of a number of series coupled thermoelectric devices, a number of parallel coupled thermoelectric devices, or combinations of parallel coupled thermoelectric devices and series coupled thermoelectric devices.

Figure 17:
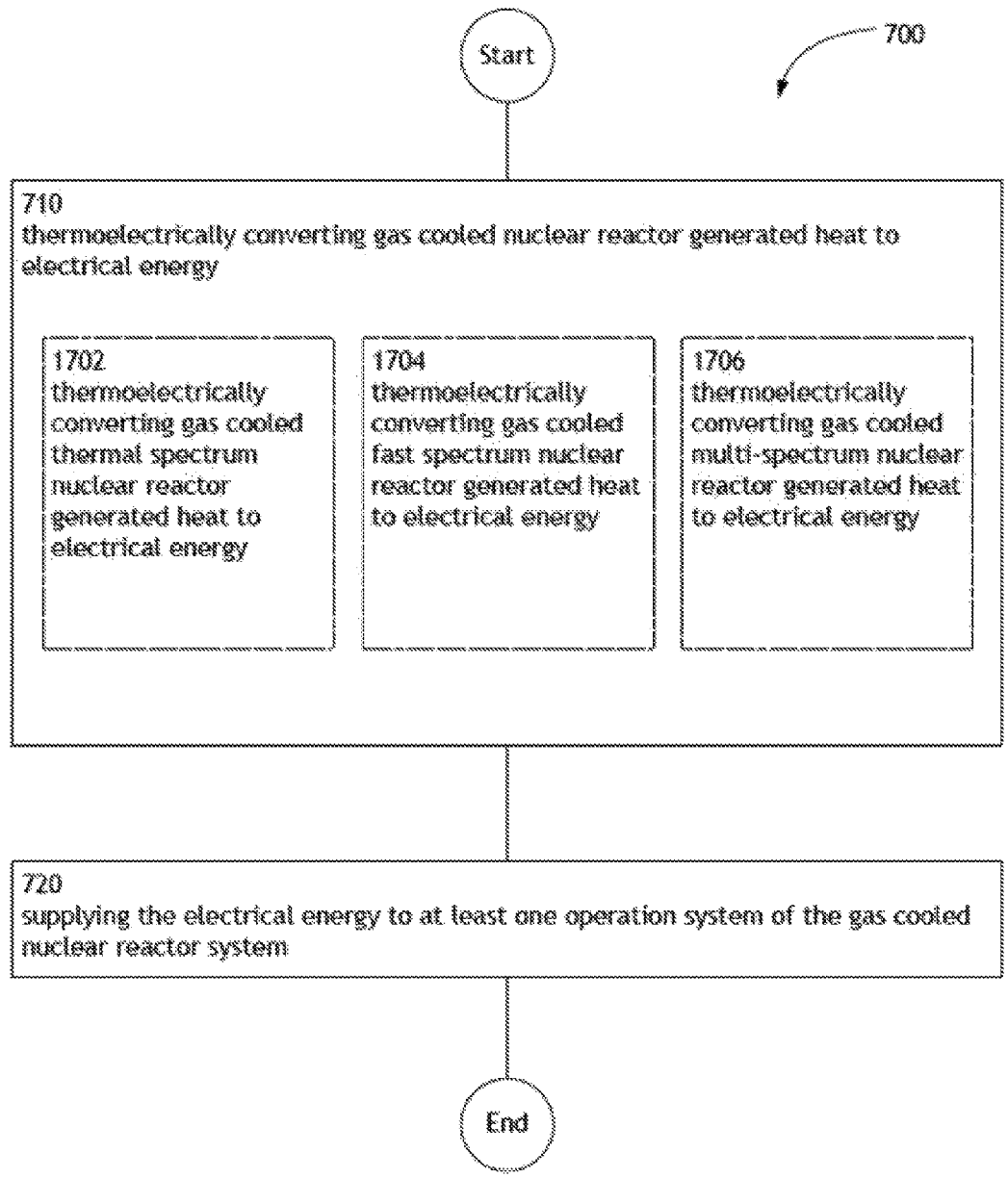

FIG. 17 illustrates alternative embodiments of the example operational flow 700 of FIG. 7. FIG. 17 illustrates example embodiments where the converting operation 710 may include at least one additional operation. Additional operations may include an operation 1702, an operation 1704, and/or an operation 1706.

At operation 1702, gas cooled thermal spectrum nuclear reactor generated heat may be thermoelectrically converted to electrical energy. For example, as shown in FIG. 1, a thermoelectric device 104 may convert heat generated by a gas cooled thermal spectrum nuclear reactor 110 of a gas cooled nuclear reactor system 100 to electrical energy.

At operation 1704, gas cooled fast spectrum nuclear reactor generated heat may be thermoelectrically converted to electrical energy. For example, as shown in FIG. 1, a thermoelectric device 104 may convert heat generated by a gas cooled fast spectrum nuclear reactor 111 of a gas cooled nuclear reactor system 100 to electrical energy.

At operation 1706, gas cooled multi-spectrum nuclear reactor generated heat may be thermoelectrically converted to electrical energy. For example, as shown in FIG. 1, a thermoelectric device 104 may convert heat generated by a gas cooled multi-spectrum nuclear reactor 112 of a gas cooled nuclear reactor system 100 to electrical energy.

Figure 18:
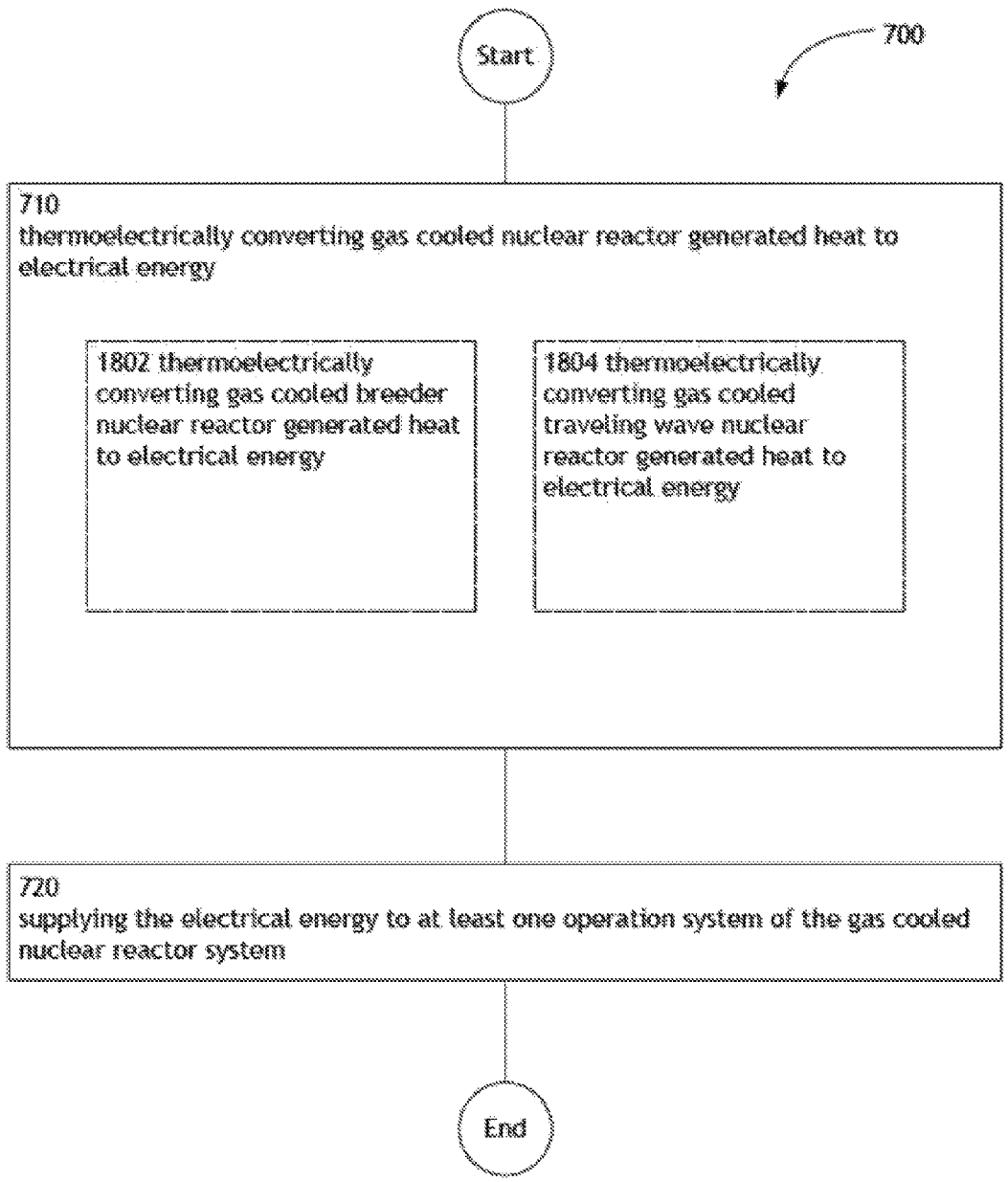

FIG. 18 illustrates alternative embodiments of the example operational flow 700 of FIG. 7. FIG. 18 illustrates example embodiments where the converting operation 710 may include at least one additional operation. Additional operations may include an operation 1802, and/or an operation 1804.

At operation 1802, gas cooled breeder nuclear reactor generated heat may be thermoelectrically converted to electrical energy. For example, as shown in FIG. 1, a thermoelectric device 104 may convert heat generated by a gas cooled breeder nuclear reactor 113 of a gas cooled nuclear reactor system 100 to electrical energy.

At operation 1804, gas cooled traveling wave nuclear reactor generated heat may be thermoelectrically converted to electrical energy. For example, as shown in FIG. 1, a thermoelectric device 104 may convert heat generated by a gas cooled traveling wave nuclear reactor 114 of a gas cooled nuclear reactor system 100 to electrical energy.

Figure 19:
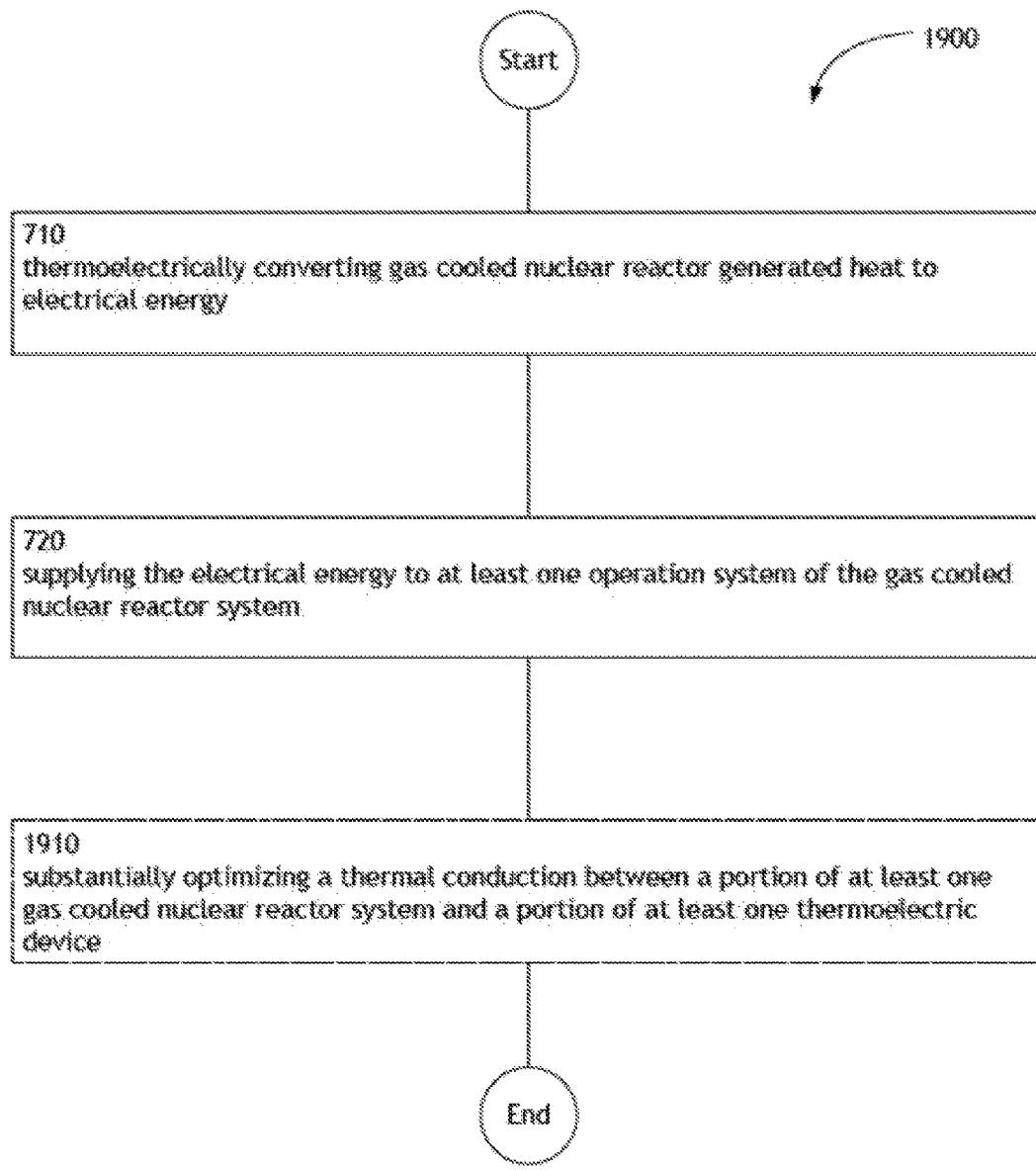

FIG. 19 illustrates an operational flow 1900 representing example operations related to the thermoelectric conversion of gas cooled nuclear reactor generated heat to electrical energy. FIG. 19 illustrates an example embodiment where the example operational flow 700 of FIG. 7 may include at least one additional operation. Additional operations may include an operation 1910.

After a start operation, a converting operation 710, and a supplying operation 720, the operational flow 1900 moves to an optimizing operation 1910. Operation 1910 illustrates substantially optimizing a thermal conduction between a portion of at least one gas cooled nuclear reactor system and a portion of at least one thermoelectric device. For example, as shown in FIG. 2, at the position of thermal communication between the thermoelectric device 104 and the gas cooled nuclear reactor system 100, the thermal conduction between the thermoelectric device 104 and the gas cooled nuclear reactor system 100 may be optimized. For example, the thermal conduction optimization 236 may include, but is not limited to, placing thermal paste, thermal glue, or a highly thermal conductive material between the thermoelectric device 104 and the nuclear reactor system 100.

Figure 20:
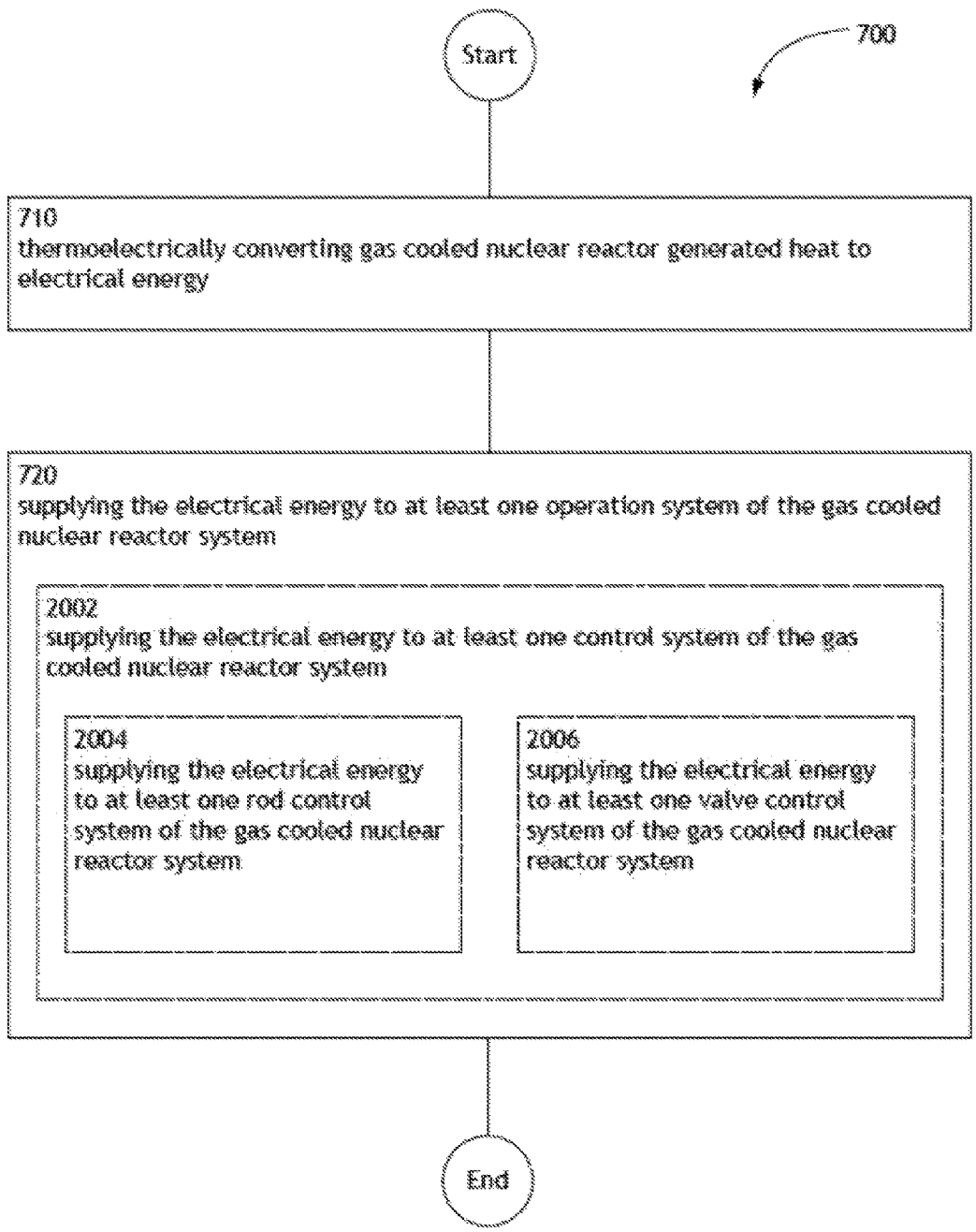

FIG. 20 illustrates alternative embodiments of the example operational flow 700 of FIG. 7. FIG. 20 illustrates example embodiments where the supplying operation 720 may include at least one additional operation. Additional operations may include an operation 2002, an operation 2004, and/or an operation 2006.

The operation 2002 illustrates supplying the electrical energy to at least one control system of the gas cooled nuclear reactor system. For example, as shown in FIG. 1, the electrical output 108 of a thermoelectric device 104 may be used to supply electrical energy to a control system 116 of a gas cooled nuclear reactor system 100.

Further, the operation 2004 illustrates supplying the electrical energy to at least one rod control system of the gas cooled nuclear reactor system. For example, as shown in FIG. 1, the control system 116 may comprise, but is not limited to, a rod control system 118. For instance, as shown in FIG. 1, the electrical output 108 of a thermoelectric device 104 may be used to supply electrical energy to a rod control system 118 of a gas cooled nuclear reactor system 100.

Further, the operation 2006 illustrates supplying the electrical energy to at least one rod control system of the gas cooled nuclear reactor system. For example, as shown in FIG. 1, the control system 116 may comprise, but is not limited to, a valve control system 120. For instance, as shown in FIG. 1, the electrical output 108 of a thermoelectric device 104 may be used to supply electrical energy to a valve control system 118 of a gas cooled nuclear reactor system 100.

Figure 21:
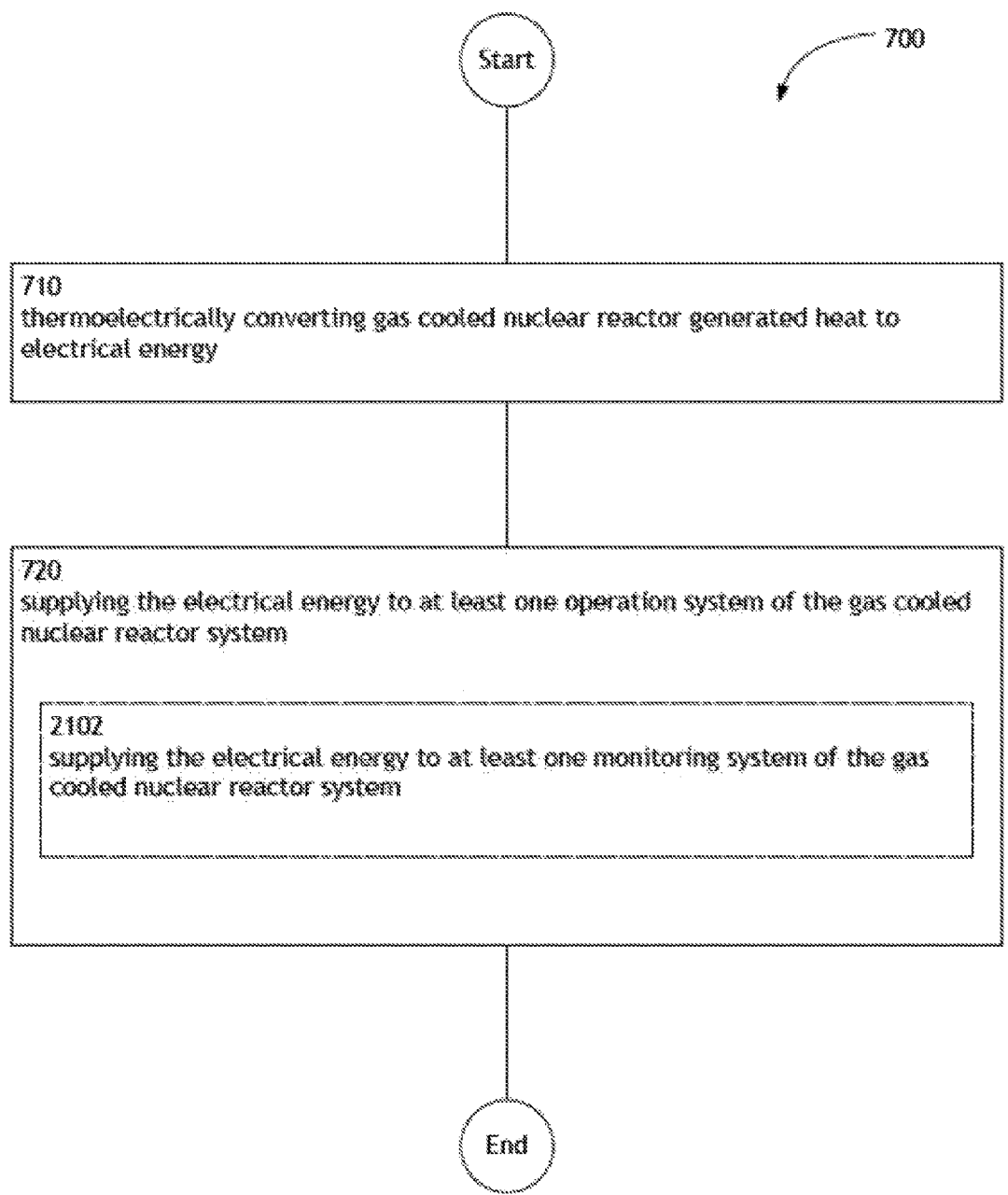

FIG. 21 illustrates alternative embodiments of the example operational flow 700 of FIG. 7. FIG. 21 illustrates example embodiments where the supplying operation 720 may include at least one additional operation. Additional operations may include an operation 2102.

The operation 2102 illustrates supplying the electrical energy to at least one monitoring system of the gas cooled nuclear reactor system. For example, as shown in FIG. 1, the electrical output 108 of a thermoelectric device 104 may be used to supply electrical energy to a monitoring system 122 (e.g., thermal monitoring system) of a gas cooled nuclear reactor system 100.

Figure 22:
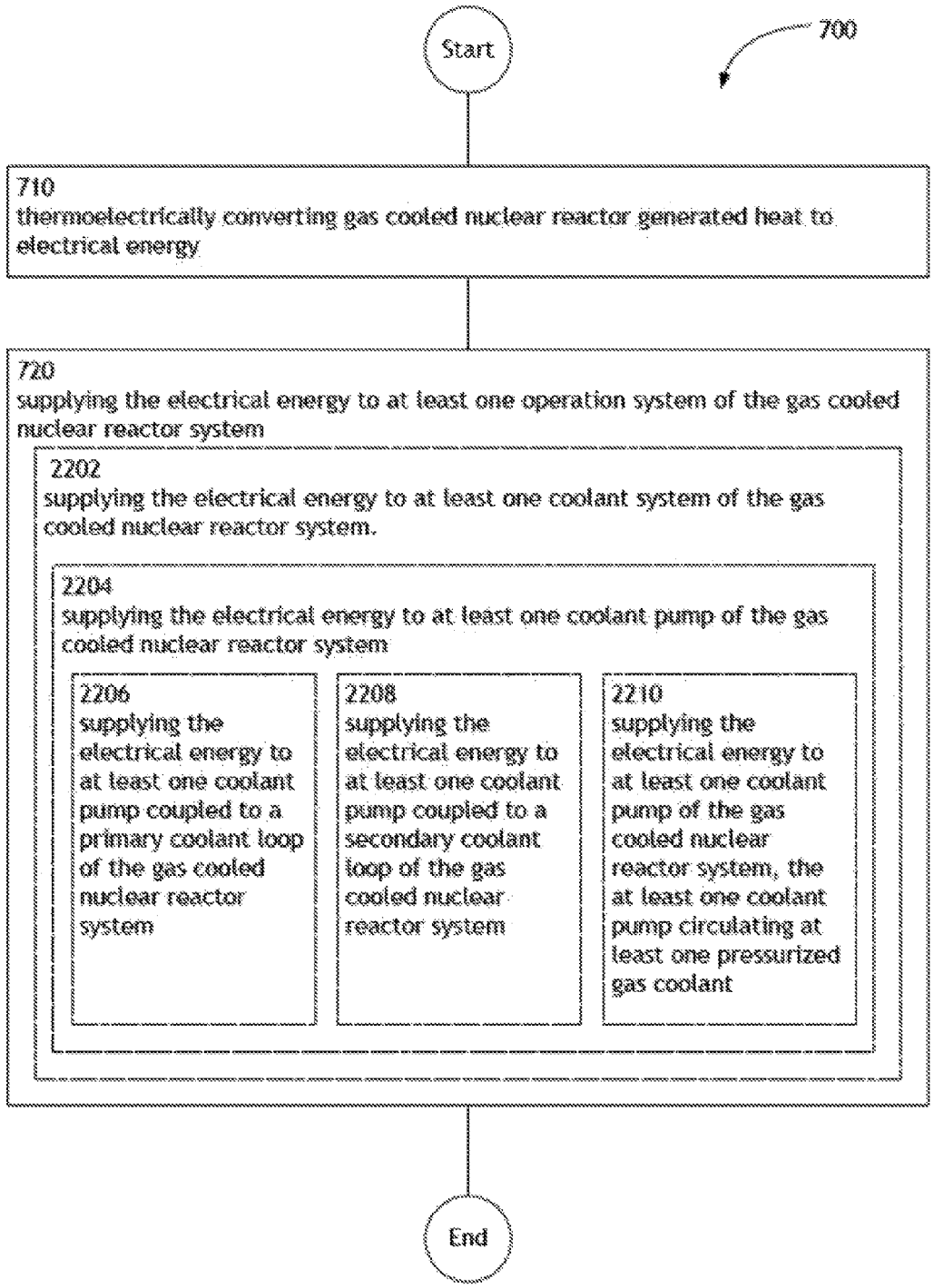

FIG. 22 illustrates alternative embodiments of the example operational flow 700 of FIG. 7. FIG. 22 illustrates example embodiments where the supplying operation 720 may include at least one additional operation. Additional operations may include an operation 2202, an operation 2204, an operation 2206, an operation 2208, and/or an operation 2210.

The operation 2202 illustrates supplying the electrical energy to at least one coolant system of the gas cooled nuclear reactor system. For example, as shown in FIG. 1, the electrical output 108 of a thermoelectric device 104 may be used to supply electrical energy to a coolant system 124 (e.g., primary coolant system) of a gas cooled nuclear reactor system 100.

Further, the operation 2204 illustrates supplying the electrical energy to at least one coolant pump of the gas cooled nuclear reactor system. For example, as shown in FIG. 1, the electrical output 108 of a thermoelectric device 104 may be used to supply electrical energy to a coolant pump 126 of a coolant system 124 of a gas cooled nuclear reactor system 100. By way of further example, the coolant pump 126 may comprise, but is not limited to, a mechanical pump.

Further, the operation 2206 illustrates supplying the electrical energy to at least one coolant pump coupled to a primary coolant loop of the gas cooled nuclear reactor system. For example, as shown in FIG. 1, the electrical output 108 of a thermoelectric device 104 may be used to supply electrical energy to a primary coolant loop 128 of a coolant system 124 of a gas cooled nuclear reactor system 100.

Further, the operation 2208 illustrates supplying the electrical energy to at least one coolant pump coupled to a secondary coolant loop of the gas cooled nuclear reactor system. For example, as shown in FIG. 1, the electrical output 108 of a thermoelectric device 104 may be used to supply electrical energy to a secondary coolant loop 130 of a coolant system 124 of a gas cooled nuclear reactor system 100.

Further, the operation 2210 illustrates supplying the electrical energy to at least one coolant pump of the gas cooled nuclear reactor system, the at least one coolant pump circulating at least one pressurized gas coolant. For example, as shown in FIG. 1, the electrical output 108 of a thermoelectric device 104 may be used to supply electrical energy to a coolant pump circulating a pressurized gas coolant 132 (e.g. helium or carbon dioxide) of a coolant system 124 of a gas cooled nuclear reactor system 100.

Figure 23:
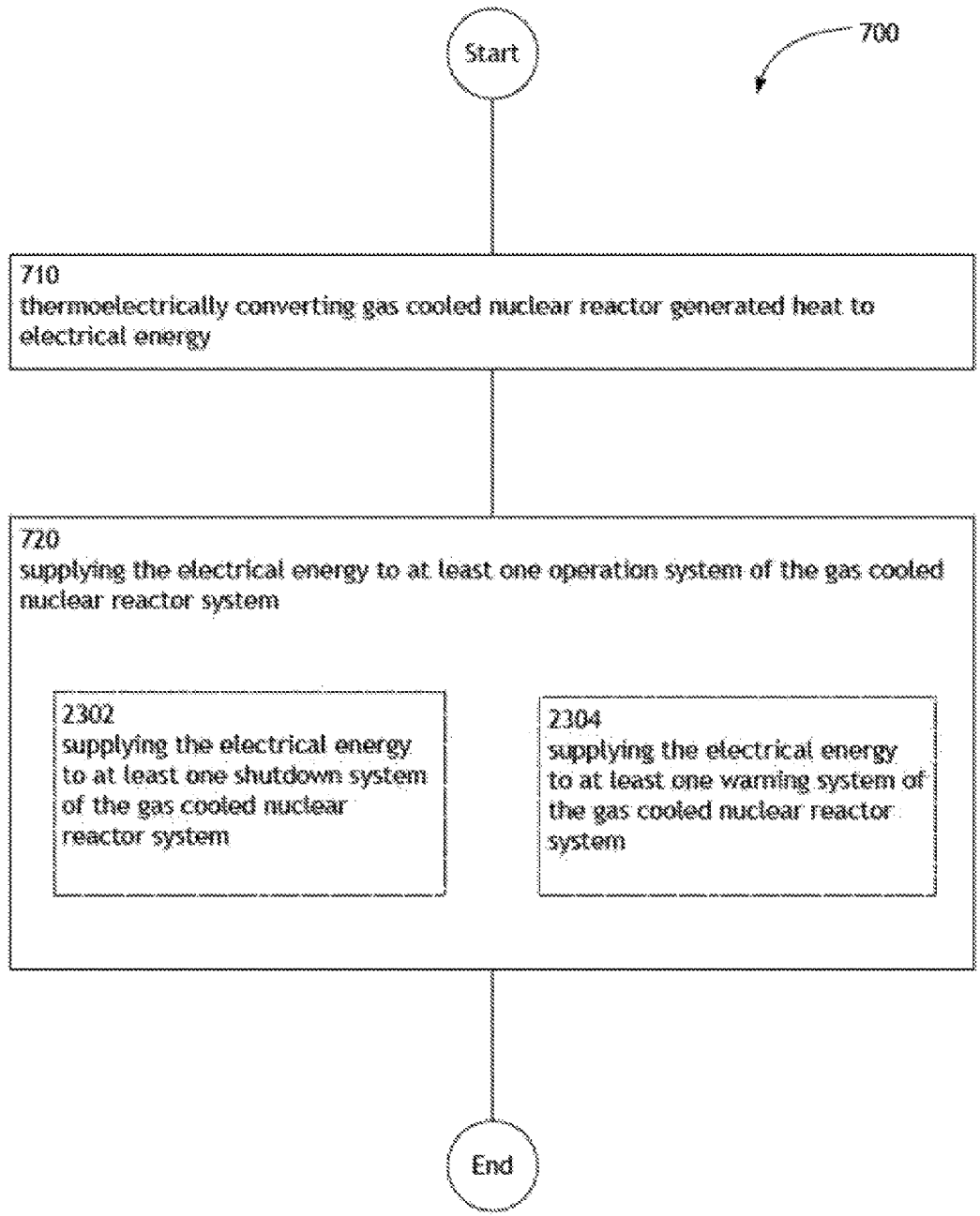

FIG. 23 illustrates alternative embodiments of the example operational flow 700 of FIG. 7. FIG. 23 illustrates example embodiments where the supplying operation 720 may include at least one additional operation. Additional operations may include an operation 2302, and/or an operation 2304.

The operation 2302 illustrates supplying the electrical energy to at least one shutdown system of the gas cooled nuclear reactor system. For example, as shown in FIG. 1, the electrical output 108 of a thermoelectric device 104 may be used to supply electrical energy to a shutdown system 134 (e.g., emergency shutdown system or scheduled shutdown system) of a gas cooled nuclear reactor system 100.

The operation 2304 illustrates supplying the electrical energy to at least one warning system of the gas cooled nuclear reactor system. For example, as shown in FIG. 1, the electrical output 108 of a thermoelectric device 104 may be used to supply electrical energy to a warning system 136 (e.g., visual warning system or audio warning system) of a gas cooled nuclear reactor system 100.

Figure 24:
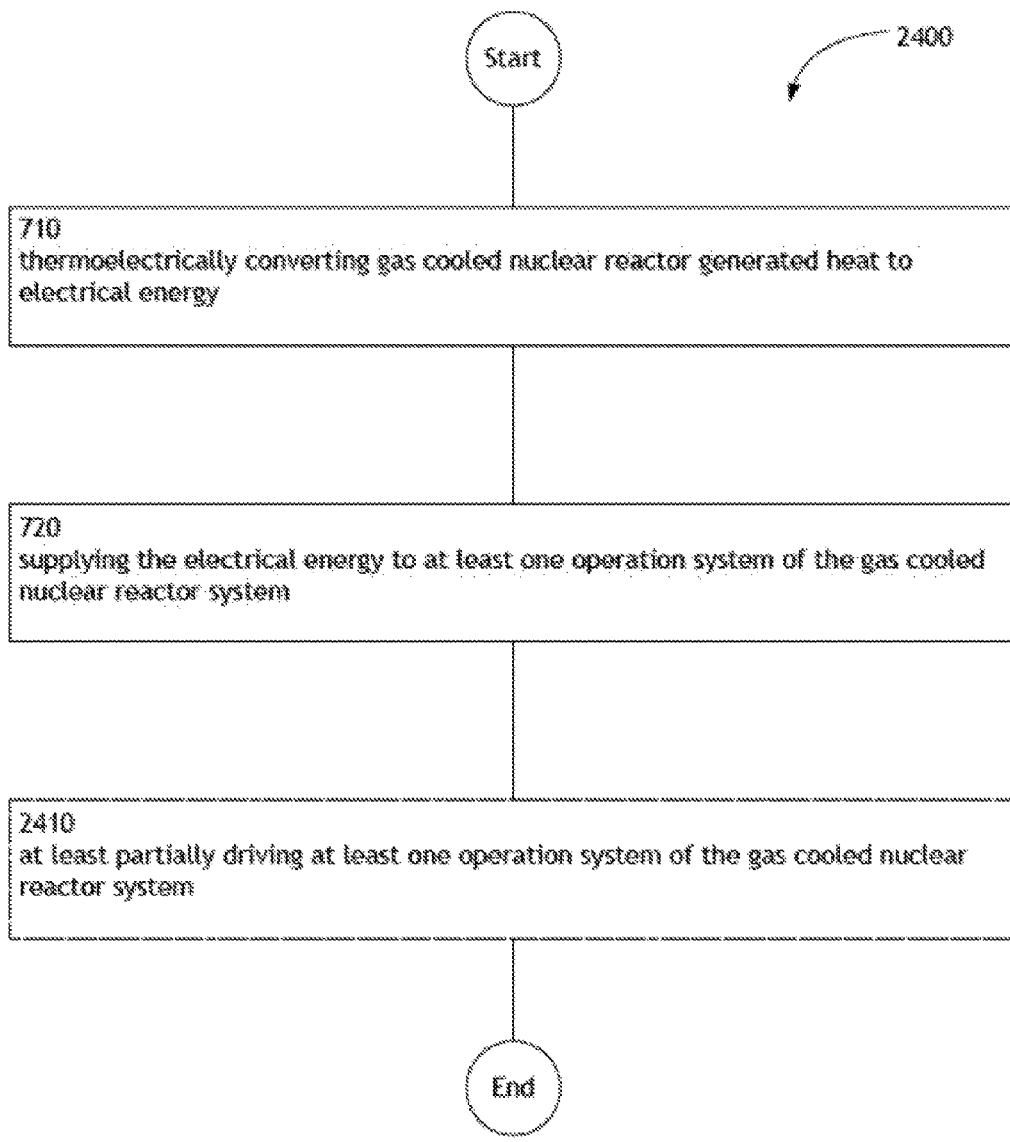

FIG. 24 illustrates an operational flow 2400 representing example operations related to the thermoelectric conversion of gas cooled nuclear reactor generated heat to electrical energy. FIG. 24 illustrates an example embodiment where the example operational flow 700 of FIG. 7 may include at least one additional operation. Additional operations may include an operation 2410.

After a start operation, a converting operation 710, and a supplying operation 720, the operational flow 2400 moves to a driving operation 2410. Operation 2410 illustrates at least partially driving at least one operation system of the gas cooled nuclear reactor system. For example, as shown in FIG. 1, the electrical output 108 of the thermoelectric device 104 may be used to partially drive an operation system 106 (e.g. control system 116, monitoring system 122, coolant system 124, shutdown system 134, or warning system 136) of the gas cooled nuclear reactor system 100. For instance, the electrical energy supplied to a rod control system 118 of a gas cooled nuclear reactor system 100 may be used to drive the rod control system 118 of the gas cooled nuclear reactor system 100. By way of further example, the electrical energy supplied to a coolant pump 126 of a coolant system 124 of a gas cooled nuclear reactor system 100 may be used to drive the coolant pump 126 of a coolant system 124 of the gas cooled nuclear reactor system 100.

Figure 25:
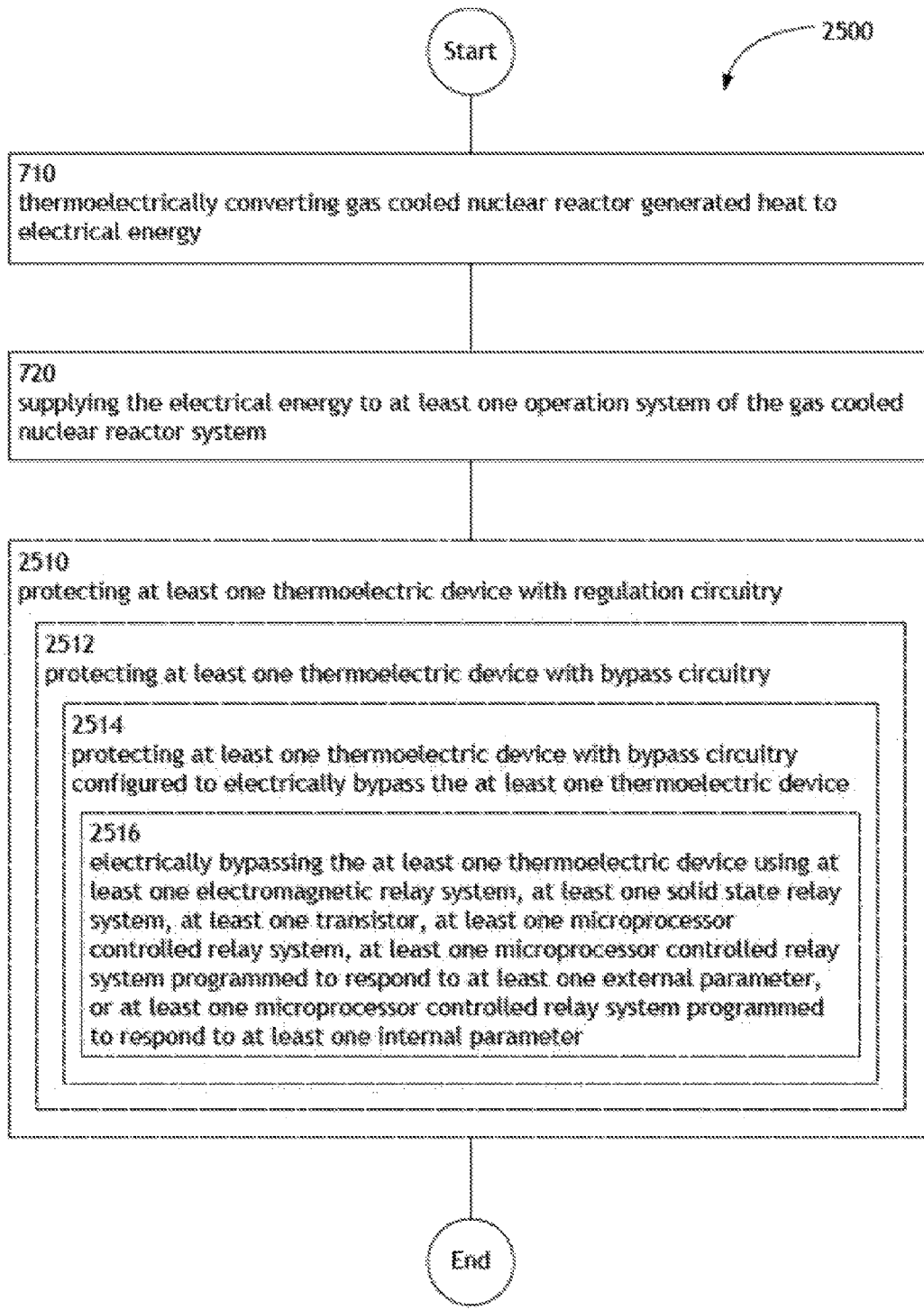

FIG. 25 illustrates an operational flow 2500 representing example operations related to the thermoelectric conversion of gas cooled nuclear reactor generated heat to electrical energy. FIG. 25 illustrates an example embodiment where the example operational flow 700 of FIG. 7 may include at least one additional operation. Additional operations may include an operation 2510, an operation 2512, an operation 2514, and/or an operation 2516.

After a start operation, a converting operation 710, and a supplying operation 720, the operational flow 2500 moves to a protecting operation 2510. Operation 2510 illustrates protecting at least one thermoelectric device with regulation circuitry. For example, as shown in FIG. 6, one or more than one thermoelectric device 104 may be protected using regulation circuitry 602, such as voltage regulation circuitry (e.g., voltage regulator) or current limiting circuitry (e.g., blocking diode or fuse).

The operation 2512 illustrates protecting at least one thermoelectric device with bypass circuitry. For example, as shown in FIG. 6, one or more than one thermoelectric device 104 may be protected using bypass circuitry 604, such as a bypass diode.

Further, the operation 2514 illustrates protecting at least one thermoelectric device with bypass circuitry configured to electrically bypass the at least one thermoelectric device. For example, as shown in FIG. 6, one or more than one thermoelectric device 104 may be protected using bypass circuitry configured to electrically bypass 606 one or more than one thermoelectric device 104.

Further, the operation 2516 illustrates electrically bypassing the at least one thermoelectric device using at least one electromagnetic relay system, at least one solid state relay system, at least one transistor, at least one microprocessor controlled relay system, at least one microprocessor controlled relay system programmed to respond to at least one external parameter, or at least one microprocessor controlled relay system programmed to respond to at least one internal parameter. For example, as shown in FIG. 6, one or more than one thermoelectric device 104 may be electrically bypassed using an electromagnetic relay system 608, a solid state relay system 610, a transistor 612, a microprocessor controlled relay system 614, a microprocessor controlled relay system programmed to respond to one or more than one external parameters 616, or a microprocessor controlled relay system programmed to respond to one or more than one internal parameters 618.

Figure 26:
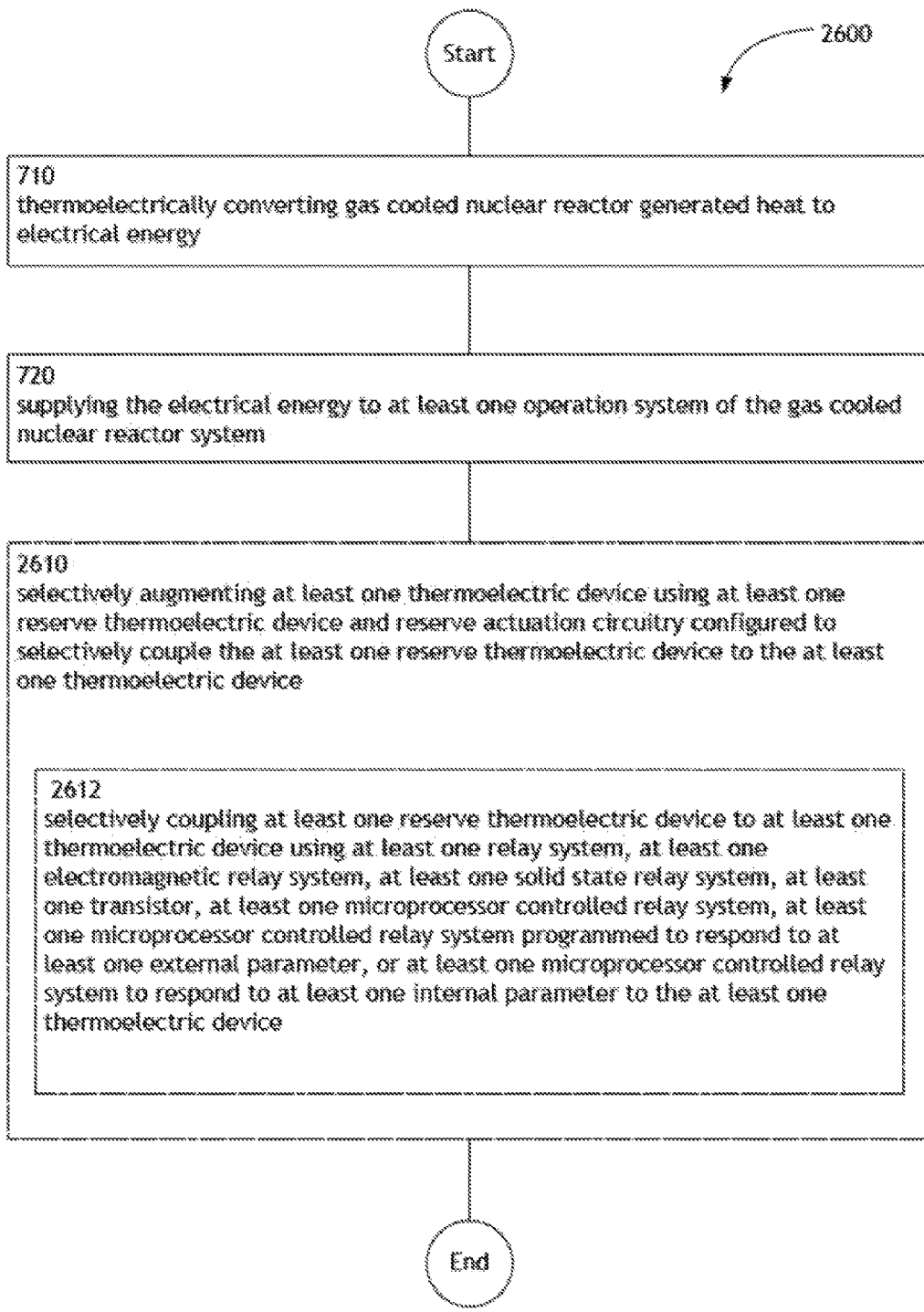

FIG. 26 illustrates an operational flow 2600 representing example operations related to the thermoelectric conversion of gas cooled nuclear reactor generated heat to electrical energy. FIG. 26 illustrates an example embodiment where the example operational flow 700 of FIG. 7 may include at least one additional operation. Additional operations may include an operation 2610, and/or an operation 2612.

After a start operation, a converting operation 710, and a supplying operation 720, the operational flow 2600 moves to an augmenting operation 2610. Operation 2610 illustrates selectively augmenting at least one thermoelectric device using at least one reserve thermoelectric device and reserve actuation circuitry configured to selectively couple the at least one reserve thermoelectric device to the at least one thermoelectric device. For example, as shown in FIG. 6, the electrical output 108 from one or more than one thermoelectric device 104 may be augmented using one or more than one reserve thermoelectric device 620, wherein the one or more than one reserve thermoelectric device 620 may be selectively coupled to the thermoelectric device 104 using reserve actuation circuitry 622.

The augmenting operation 2612 illustrates selectively coupling at least one reserve thermoelectric device to at least one thermoelectric device using at least one relay electromagnetic system, at least one electromagnetic relay system, at least one solid state relay system, at least one transistor, at least one microprocessor controlled relay system, at least one microprocessor controlled relay system programmed to respond to at least one external parameter, or at least one microprocessor controlled relay system to respond to at least one internal parameter to the at least one thermoelectric device. For example, as shown in FIG. 6, the electrical output 108 from one or more than one thermoelectric device 104 may be augmented using one or more than one reserve thermoelectric device 620, where the one or more than one reserve thermoelectric device 620 may be selectively coupled to the thermoelectric device 104 using a relay system 624. For instance, the relay system may comprise, but is not limited to, an electromagnetic relay system 626, a solid state relay system 628, a transistor 630, a microprocessor controlled relay system 632, a microprocessor controlled relay system programmed to respond to at least one external parameter 634, or a microprocessor controlled relay system programmed to respond to at least one internal parameter 636.

Figure 27:
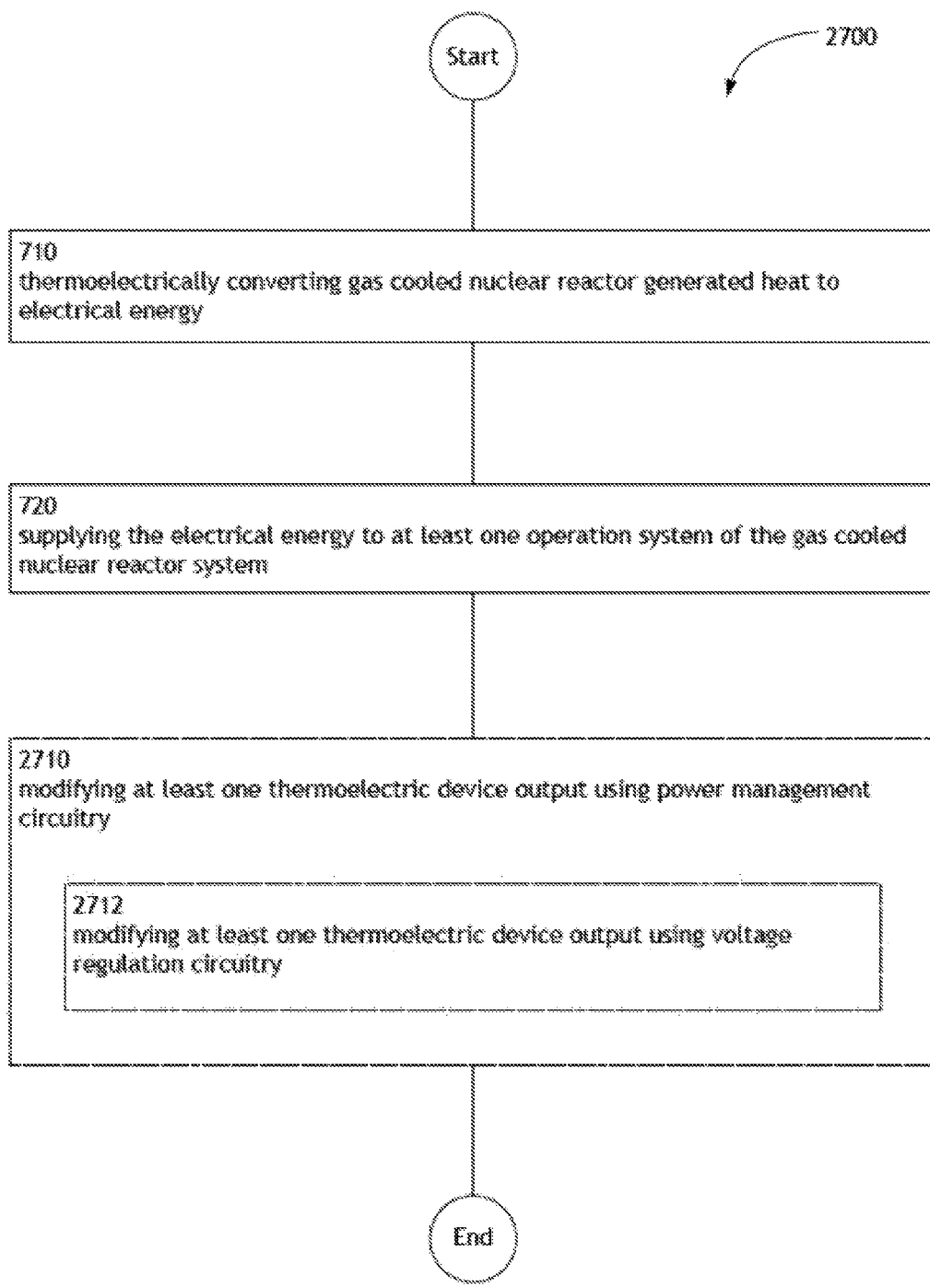

FIG. 27 illustrates an operational flow 2700 representing example operations related to the thermoelectric conversion of nuclear reactor generated heat to electrical energy. FIG. 27 illustrates an example embodiment where the example operational flow 700 of FIG. 7 may include at least one additional operation. Additional operations may include an operation 2710, and/or an operation 2712.

After a start operation, a converting operation 710, and a supplying operation 720, the operational flow 2700 moves to a modifying operation 2710. Operation 2710 illustrates modifying at least one thermoelectric device output using power management circuitry. For example, as shown in FIG. 6, the electrical output 108 of a thermoelectric device 104 may be modified using power management circuitry 638. For instance, the power management circuitry may comprise, but is not limited to, a voltage converter (e.g., DC-DC converter or DC-AC inverter).

The operation 2712 illustrates modifying at least one thermoelectric device output using voltage regulation circuitry. For example, as shown in FIG. 6, the electrical output 108 of a thermoelectric device 104 may be modified using voltage regulation circuitry 640. For instance, the voltage regulation circuitry may comprise, but is not limited to, a voltage regulator (e.g., Zener diode, an adjustable voltage regulator or a fixed voltage regulator).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
   means for thermoelectrically converting heat generated with a gas cooled nuclear reactor system to electrical energy;
   bypass circuitry means operationally connected to the means for thermoelectrically converting heat for protecting the means for thermoelectrically converting heat; and
   means for supplying the electrical energy to at least one operation system of the gas cooled nuclear reactor system.

2. The system of claim 1, wherein the means for thermoelectrically converting heat generated with a gas cooled nuclear reactor system to electrical energy comprises:
   at least one thermoelectric device for thermoelectrically converting heat generated with a gas cooled nuclear reactor system to electrical energy.

3. The system of claim 2, wherein the at least one thermoelectric device for thermoelectrically converting gas cooled nuclear reactor generated heat to electrical energy comprises:
   at least one thermoelectric junction for thermoelectrically converting gas cooled nuclear reactor generated heat to electrical energy.

4. The system of claim 2, wherein the at least one thermoelectric device for thermoelectrically converting gas cooled nuclear reactor generated heat to electrical energy comprises:
   at least one thermoelectric device optimized for a specified range of operating characteristics for thermoelectrically converting gas cooled nuclear reactor generated heat to electrical energy.

5. The system of claim 2, wherein the at least one thermoelectric device for thermoelectrically converting gas cooled nuclear reactor generated heat to electrical energy comprises:
   at least one thermoelectric device optimized for a first range of operating characteristics and at least one additional thermoelectric device optimized for a second range of operating characteristics, the second range of operating characteristics different from the first range of operating characteristics, for thermoelectrically converting gas cooled nuclear reactor generated heat to electrical energy.

6. The system of claim 2, wherein the at least one thermoelectric device for thermoelectrically converting heat generated with a gas cooled nuclear reactor system to electrical energy comprises:
   at least one thermoelectric device sized to meet at least one selected operational requirement of the gas cooled nuclear reactor system for thermoelectrically converting heat generated with a gas cooled nuclear reactor system to electrical energy.

7. The system of claim 6, wherein the at least one thermoelectric device sized to meet at least one selected operational requirement of the gas cooled nuclear reactor system for thermoelectrically converting heat generated with a gas cooled nuclear reactor system to electrical energy comprises:
   at least one thermoelectric device sized to at least partially match the heat rejection of the at least one thermoelectric device with at least a portion of the heat produced by the gas cooled nuclear reactor for thermoelectrically converting heat generated with a gas cooled nuclear reactor system to electrical energy.

8. The system of claim 6, wherein the at least one thermoelectric device sized to meet at least one selected operational requirement of the gas cooled nuclear reactor system for thermoelectrically converting gas cooled nuclear reactor generated heat to electrical energy comprises:
   at least one thermoelectric device sized to at least partially match the power requirements of at least one selected operation system for thermoelectrically converting gas cooled nuclear reactor generated heat to electrical energy.

9. The system of claim 1, wherein the means for thermoelectrically converting gas cooled nuclear reactor generated heat to electrical energy comprises:
   at least two series coupled thermoelectric devices for thermoelectrically converting gas cooled nuclear reactor generated heat to electrical energy.

10. The system of claim 1, wherein the means for thermoelectrically converting gas cooled nuclear reactor generated heat to electrical energy comprises:
    at least two parallel coupled thermoelectric devices for thermoelectrically converting gas cooled nuclear reactor generated heat to electrical energy.

11. The system of claim 1, wherein the means for thermoelectrically converting heat generated with a gas cooled nuclear reactor system to electrical energy comprises:
    at least one thermoelectric module for thermoelectrically converting heat generated with a gas cooled nuclear reactor system to electrical energy.

12. The system of claim 2, wherein the at least one thermoelectric device for thermoelectrically converting heat generated with a gas cooled nuclear reactor system to electrical energy comprises:
    at least one thermoelectric device having at least a first portion in thermal communication with a first portion of the gas cooled nuclear reactor system and at least a second portion in thermal communication with a second portion of the gas cooled nuclear reactor system, for thermoelectrically converting gas cooled nuclear reactor generated heat to electrical energy.

13. The system of claim 12, wherein the at least one thermoelectric device having at least a first portion in thermal communication with a first portion of the gas cooled nuclear reactor system and at least a second portion in thermal communication with a second portion of the gas cooled nuclear reactor system, for thermoelectrically converting heat generated with a gas cooled nuclear reactor system to electrical energy comprises:
    at least one thermoelectric device having at least a first portion in thermal communication with at least one heat source of the gas cooled nuclear reactor system, for thermoelectrically converting heat generated with a gas cooled nuclear reactor system to electrical energy.

14. The system of claim 13, wherein the at least one thermoelectric device having at least a first portion in thermal communication with at least one heat source of the gas cooled nuclear reactor system, for thermoelectrically converting heat generated with a gas cooled nuclear reactor system to electrical energy comprises:
    at least one thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of a coolant of the gas cooled nuclear reactor system, for thermoelectrically converting heat generated with a gas cooled nuclear reactor system to electrical energy.

15. The system of claim 12, wherein the at least one thermoelectric device having at least a first portion in thermal communication with a first portion of the gas cooled nuclear reactor system and at least a second portion in thermal communication with a second portion of the gas cooled nuclear reactor system, for thermoelectrically converting heat generated with a gas cooled nuclear reactor system to electrical energy comprises:
    at least one thermoelectric device having at least a second portion in thermal communication with a second portion of the gas cooled nuclear reactor system, the second portion of the gas cooled nuclear reactor system at a lower temperature than the first portion of the gas cooled nuclear reactor system, for thermoelectrically converting heat generated with a gas cooled nuclear reactor system to electrical energy.

16. The system of claim 15, wherein the at least one thermoelectric device having at least a second portion in thermal communication with a second portion of the gas cooled nuclear reactor system, the second portion of the gas cooled nuclear reactor system at a lower temperature than the first portion of the gas cooled nuclear reactor system, for thermoelectrically converting heat generated with a gas cooled nuclear reactor system to electrical energy comprises:
    at least one thermoelectric device having at least a second portion in thermal communication with at least a portion of at least one coolant loop, at least a portion of at least one coolant pipe, at least a portion of at least one heat exchanger, at least a portion of a coolant of the gas cooled nuclear reactor system, or at least a portion of at least one environmental reservoir, for thermoelectrically converting heat generated with a gas cooled nuclear reactor system to electrical energy.

17. The system of claim 1, further comprising:
    means for substantially increasing a thermal conduction between a portion of the gas cooled nuclear reactor system and a portion of at least one thermoelectric device.

18. The system of claim 1, wherein the means for supplying the electrical energy to at least one operation system of the gas cooled nuclear reactor system comprises:
    means for supplying the electrical energy to at least one control system of the gas cooled nuclear reactor system.

19. The system of claim 1, wherein the means for supplying the electrical energy to at least one operation system of the gas cooled nuclear reactor system comprises:
    means for supplying the electrical energy to at least one monitoring system of the gas cooled nuclear reactor system.

20. The system of claim 1, wherein the means for supplying the electrical energy to at least one operation system of the gas cooled nuclear reactor system comprises:
    means for supplying the electrical energy to at least one coolant system of the gas cooled nuclear reactor system.

21. The system of claim 20, wherein the means for supplying the electrical energy to at least one coolant system of the gas cooled nuclear reactor system comprises:
    means for supplying the electrical energy to at least one coolant pump of the gas cooled nuclear reactor system.

22. The system of claim 21, wherein the means for supplying the electrical energy to at least one coolant pump of the gas cooled nuclear reactor system comprises:
    means for supplying the electrical energy to at least one coolant pump coupled to a primary coolant loop of the gas cooled nuclear reactor system.

23. The system of claim 21, wherein the means for supplying the electrical energy to at least one coolant pump of the gas cooled nuclear reactor system comprises:
    means for supplying the electrical energy to at least one coolant pump coupled to a secondary coolant loop of the gas cooled nuclear reactor system.

24. The system of claim 21, wherein the means for supplying the electrical energy to at least one coolant pump of the gas cooled nuclear reactor system comprises:
    means for supplying the electrical energy to at least one coolant pump of the gas cooled nuclear reactor system, the at least one coolant pump circulating at least one pressurized gas coolant.

25. The system of claim 1, wherein the means for supplying the electrical energy to at least one operation system of the gas cooled nuclear reactor system comprises:
    means for supplying the electrical energy to at least one shutdown system of the gas cooled nuclear reactor system.

26. The system of claim 1, wherein the means for supplying the electrical energy to at least one operation system of the gas cooled nuclear reactor system comprises:

means for supplying the electrical energy to at least one warning system of the gas cooled nuclear reactor system.

27. The system of claim 1, further comprising:
means for at least partially driving at least one operation system of the gas cooled nuclear reactor system.

28. The system of claim 1, wherein the circuitry means for protecting at least one thermoelectric device comprises:
regulation circuitry for protecting at least one thermoelectric device.

29. The system of claim 1, further comprising:
means for selectively augmenting the at least one thermoelectric device.

30. The system of claim 1, wherein the circuitry means for selectively augmenting at least one thermoelectric device comprises:
at least one reserve thermoelectric device and reserve actuation circuitry configured to selectively couple the at least one reserve thermoelectric device to the at least one thermoelectric device.

31. The system of claim 1, further comprising:
means for modifying at least one thermoelectric device output.

32. An apparatus, comprising:
at least one thermoelectric device for thermoelectrically converting heat generated with a gas cooled nuclear reactor system to electrical energy;
regulation circuitry for protecting at least one thermoelectric device; and
at least one electrical output of the at least one thermoelectric device electrically coupled to at least one operation system of the gas cooled nuclear reactor system for supplying the electrical energy to the at least one operation system of the gas cooled nuclear reactor system.

33. The apparatus of claim 32, wherein the at least one thermoelectric device for thermoelectrically converting gas cooled nuclear reactor generated heat to electrical energy comprises:
at least one thermoelectric junction for thermoelectrically converting gas cooled nuclear reactor generated heat to electrical energy.

34. The apparatus of claim 33, wherein the at least one thermoelectric junction for thermoelectrically converting gas cooled nuclear reactor generated heat to electrical energy comprises:
at least one semiconductor-semiconductor junction for thermoelectrically converting gas cooled nuclear reactor generated heat to electrical energy.

35. The apparatus of claim 34, wherein the at least one semiconductor-semiconductor junction for thermoelectrically converting gas cooled nuclear reactor generated heat to electrical energy comprises:
at least one p-type/n-type junction for thermoelectrically converting gas cooled nuclear reactor generated heat to electrical energy.

36. The apparatus of claim 33, wherein the at least one thermoelectric junction for thermoelectrically converting gas cooled nuclear reactor generated heat to electrical energy comprises:
at least one metal-metal junction for thermoelectrically converting gas cooled nuclear reactor generated heat to electrical energy.

37. The apparatus of claim 32, wherein the at least one thermoelectric device for thermoelectrically converting gas cooled nuclear reactor generated heat to electrical energy comprises:
at least one nanofabricated thermoelectric device for thermoelectrically converting gas cooled nuclear reactor generated heat to electrical energy.

38. The apparatus of claim 32, wherein the at least one thermoelectric device for thermoelectrically converting gas cooled nuclear reactor generated heat to electrical energy comprises:
at least one thermoelectric device optimized for a specified range of operating characteristics for thermoelectrically converting gas cooled nuclear reactor generated heat to electrical energy.

39. The apparatus of claim 32, wherein the at least one thermoelectric device for thermoelectrically converting gas cooled nuclear reactor generated heat to electrical energy comprises:
at least one thermoelectric device optimized for a first range of operating characteristics and at least one additional thermoelectric device optimized for a second range of operating characteristics, the second range of operating characteristics different from the first range of operating characteristics, for thermoelectrically converting gas cooled nuclear reactor generated heat to electrical energy.

40. The apparatus of claim 32, wherein the at least one thermoelectric device for thermoelectrically converting heat generated with a gas cooled nuclear reactor system to electrical energy comprises:
at least one thermoelectric device sized to meet at least one selected operational requirement of the gas cooled nuclear reactor system for thermoelectrically converting heat generated with a gas cooled nuclear reactor system to electrical energy.

41. The apparatus of claim 40, wherein the at least one thermoelectric device sized to meet at least one selected operational requirement of the gas cooled nuclear reactor system for thermoelectrically converting heat generated with a gas cooled nuclear reactor system to electrical energy comprises:
at least one thermoelectric device sized to at least partially match the heat rejection of the at least one thermoelectric device with at least a portion of the heat produced by the gas cooled nuclear reactor for thermoelectrically converting heat generated with a gas cooled nuclear reactor system to electrical energy.

42. The apparatus of claim 40, wherein the at least one thermoelectric device sized to meet at least one selected operational requirement of the gas cooled nuclear reactor system for thermoelectrically converting gas cooled nuclear reactor generated heat to electrical energy comprises:
at least one thermoelectric device sized to at least partially match the power requirements of at least one selected operation system for thermoelectrically converting gas cooled nuclear reactor generated heat to electrical energy.

43. The apparatus of claim 32, wherein the at least one thermoelectric device for thermoelectrically converting gas cooled nuclear reactor generated heat to electrical energy comprises:
at least two series coupled thermoelectric devices for thermoelectrically converting gas cooled nuclear reactor generated heat to electrical energy.

44. The apparatus of claim 32, wherein the at least one thermoelectric device for thermoelectrically converting gas cooled nuclear reactor generated heat to electrical energy comprises:

at least two parallel coupled thermoelectric devices for thermoelectrically converting gas cooled nuclear reactor generated heat to electrical energy.

45. The apparatus of claim 32, wherein the at least one thermoelectric device for thermoelectrically converting heat generated with a gas cooled nuclear reactor system to electrical energy comprises:
at least one thermoelectric module for thermoelectrically converting heat generated with a gas cooled nuclear reactor system to electrical energy.

46. The apparatus of claim 32, wherein the at least one thermoelectric device for thermoelectrically converting heat generated with a gas cooled nuclear reactor system to electrical energy comprises:
at least one thermoelectric device, the thermoelectric device having at least a first portion in thermal communication with a first portion of the gas cooled nuclear reactor system and at least a second portion in thermal communication with a second portion of the gas cooled nuclear reactor system, for thermoelectrically converting heat generated with a gas cooled nuclear reactor system to electrical energy.

47. The apparatus of claim 46, wherein the at least one thermoelectric device, the thermoelectric device having at least a first portion in thermal communication with a first portion of the gas cooled nuclear reactor system and at least a second portion in thermal communication with a second portion of the gas cooled nuclear reactor system, for converting heat generated with a gas cooled nuclear reactor system to electrical energy comprises:
at least one thermoelectric device, the thermoelectric device having at least a first portion in thermal communication with at least one heat source of the gas cooled nuclear reactor system, for thermoelectrically converting heat generated with a gas cooled nuclear reactor system to electrical energy.

48. The apparatus of claim 47, wherein the at least one thermoelectric device, the thermoelectric device having at least a first portion in thermal communication with at least one heat source of the gas cooled nuclear reactor system, for thermoelectrically converting heat generated with a gas cooled nuclear reactor system to electrical energy comprises:
at least one thermoelectric device, the thermoelectric device having at least a first portion in thermal communication with at least a portion of a nuclear reactor core, at least a portion of at least one pressure vessel, at least a portion of at least one containment vessel, at least a portion of at least one coolant loop, at least a portion of at least one coolant pipe, at least a portion of at least one heat exchanger, or at least a portion of a coolant of the gas cooled nuclear reactor system, for thermoelectrically converting heat generated with a gas cooled nuclear reactor system to electrical energy.

49. The apparatus of claim 46, wherein the at least one thermoelectric device, the thermoelectric device having at least a first portion in thermal communication with a first portion of the gas cooled nuclear reactor system and at least a second portion in thermal communication with a second portion of the gas cooled nuclear reactor system, for thermoelectrically converting heat generated with a gas cooled nuclear reactor system to electrical energy comprises:
at least one thermoelectric device, the thermoelectric device having at least a second portion in thermal communication with a second portion of the gas cooled nuclear reactor system, the second portion of the gas cooled nuclear reactor system at a lower temperature than the first portion of the gas cooled nuclear reactor system, for thermoelectrically converting heat generated with a gas cooled nuclear reactor system to electrical energy.

50. The apparatus of claim 49, wherein the at least one thermoelectric device, the thermoelectric device having at least a second portion in thermal communication with a second portion of the gas cooled nuclear reactor system, the second portion of the gas cooled nuclear reactor system at a lower temperature than the first portion of the gas cooled nuclear reactor system, for thermoelectrically converting heat generated with a gas cooled nuclear reactor system to electrical energy comprises:
at least one thermoelectric device, the thermoelectric device having at least a second portion in thermal communication with at least a portion of at least one coolant loop, at least a portion of at least one coolant pipe, at least a portion of at least one heat exchanger, at least a portion of a coolant of the gas cooled nuclear reactor system, or at least a portion of at least one environmental reservoir, for thermoelectrically converting heat generated with a gas cooled nuclear reactor system to electrical energy.

51. The apparatus of claim 32, further comprising:
at least one substance or at least one device for substantially increasing a thermal conduction between a portion of at least one gas cooled nuclear reactor system and a portion of at least one thermoelectric device.

52. The apparatus of claim 32, wherein the at least one operation system of the gas cooled nuclear reactor system comprises:
at least one control system of the gas cooled nuclear reactor system.

53. The apparatus of claim 52, wherein the at least one control system of the gas cooled nuclear reactor system comprises:
at least one rod control system of the gas cooled nuclear reactor system.

54. The apparatus of claim 52, wherein the at least one control system of the gas cooled nuclear reactor system comprises:
at least one valve control system of the gas cooled nuclear reactor system.

55. The apparatus of claim 32, wherein the at least one operation system of the gas cooled nuclear reactor system comprises:
at least one monitoring system of the gas cooled nuclear reactor system.

56. The apparatus of claim 32, wherein the at least one operation system of the gas cooled nuclear reactor system comprises:
at least one coolant system of the gas cooled nuclear reactor system.

57. The apparatus of claim 56, wherein the at least one coolant system of the gas cooled nuclear reactor system comprises:
at least one coolant pump of the gas cooled nuclear reactor system.

58. The apparatus of claim 56, wherein the at least one coolant system of the gas cooled nuclear reactor system comprises:
at least one coolant pump coupled to a primary coolant loop of the gas cooled nuclear reactor system.

59. The apparatus of claim 56, wherein the at least one coolant system or the gas cooled nuclear reactor system comprises:

at least one coolant pump coupled to a secondary coolant loop of the gas cooled nuclear reactor system.

60. The apparatus of claim 56, wherein the at least one coolant system of the gas cooled nuclear reactor system comprises:
at least one coolant pump circulating at least one pressurized gas coolant of the gas cooled nuclear reactor system.

61. The apparatus of claim 32, wherein the at least one operation system of the gas cooled nuclear reactor system comprises:
at least one shutdown system of the gas cooled nuclear reactor system.

62. The apparatus of claim 32, wherein the at least one operation system of the gas cooled nuclear reactor system comprises:
at least one warning system of the gas cooled nuclear reactor system.

63. The apparatus of claim 32, wherein the regulation circuitry for protecting at least one thermoelectric device comprises:
bypass circuitry for protecting at least one thermoelectric device.

64. The apparatus of claim 32, further comprising:
at least one reserve thermoelectric device and reserve actuation circuitry configured to selectively couple the at least one reserve thermoelectric device to the at least one thermoelectric device for selectively augmenting at least one thermoelectric device.

65. The apparatus of claim 64, wherein the at least one reserve thermoelectric device and reserve actuation circuitry configured to selectively couple the at least one reserve thermoelectric device to the at least one thermoelectric device for selectively augmenting at least one thermoelectric device comprises:
at least one relay system, at least one electromagnetic relay system, at least one solid state relay system, at least one transistor, at least one microprocessor controlled relay system, at least one microprocessor controlled relay system programmed to respond to at least one external parameter, or at least one microprocessor controlled relay system programmed to respond to at least one internal parameter of the at least one thermoelectric device.

66. The apparatus of claim 32, further comprising:
power management circuitry for modifying at least one thermoelectric device output.

67. The apparatus of claim 66, wherein the power management circuitry for modifying at least one thermoelectric device output comprises:
voltage regulation circuitry for modifying at least one thermoelectric device.

* * * * *